(12) United States Patent
Flick et al.

(10) Patent No.: US 11,468,684 B2
(45) Date of Patent: Oct. 11, 2022

(54) SITUATIONAL AWARENESS MONITORING

(71) Applicant: COMMONWEALTH SCIENTIFIC AND INDUSTRIAL RESEARCH ORGANISATION, Acton (AU)

(72) Inventors: Paul Damien Flick, Acton (AU); Nicholas James Panitz, Acton (AU); Peter John Dean, Acton (AU); Marc Karim Elmouttie, Acton (AU); Gregoire Krahenbuhl, Acton (AU); Sisi Liang, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 0 days.

(21) Appl. No.: 17/417,315

(22) PCT Filed: Feb. 11, 2020

(86) PCT No.: PCT/AU2020/050113
§ 371 (c)(1),
(2) Date: Jun. 22, 2021

(87) PCT Pub. No.: WO2020/163908
PCT Pub. Date: Aug. 20, 2020

(65) Prior Publication Data
US 2022/0004775 A1    Jan. 6, 2022

(30) Foreign Application Priority Data
Feb. 12, 2019 (AU) .................... 2019900442

(51) Int. Cl.
*G06V 20/52* (2022.01)
*G06T 7/80* (2017.01)
(Continued)

(52) U.S. Cl.
CPC ............ *G06V 20/53* (2022.01); *G06K 9/628* (2013.01); *G06T 7/292* (2017.01); *G06T 7/73* (2017.01);
(Continued)

(58) Field of Classification Search
None
See application file for complete search history.

(56) References Cited

U.S. PATENT DOCUMENTS

| 4,942,539 A | 7/1990 | McGee et al. |
| 5,323,470 A | 6/1994 | Kara et al. |

(Continued)

FOREIGN PATENT DOCUMENTS

| CN | 203331022 U | 12/2013 |
| CN | 104049586 A | 9/2014 |

(Continued)

OTHER PUBLICATIONS

International Search Report for PCT/AU2020/050113 (PCT/ISA/210) dated Apr. 2, 2020.
(Continued)

*Primary Examiner* — Delomia L Gilliard
(74) *Attorney, Agent, or Firm* — Birch, Stewart, Kolasch & Birch, LLP

(57) ABSTRACT

A system for situational awareness monitoring within an environment, wherein the system includes one or more processing devices configured to receive an image stream including a plurality of captured images from each of a plurality of imaging devices, the plurality of imaging devices being configured to capture images of objects within the environment and at least some of the imaging devices being positioned within the environment to have at least partially overlapping fields of view, identify overlapping images in the different image streams, the overlapping (Continued)

images being images captured by imaging devices having overlapping fields of view, analyse the overlapping images to determine object locations within the environment, analyse changes in the object locations over time to determine object movements within the environment, compare the object movements to situational awareness rules and use results of the comparison to identify situational awareness events.

21 Claims, 14 Drawing Sheets

(51) Int. Cl.
| | |
|---|---|
| G06T 7/292 | (2017.01) |
| G06T 7/73 | (2017.01) |
| G06K 9/62 | (2022.01) |
| G08B 13/196 | (2006.01) |

(52) U.S. Cl.
CPC .......... *G06T 7/80* (2017.01); *G08B 13/19606* (2013.01); *G08B 13/19608* (2013.01); *G08B 13/19645* (2013.01); *G08B 13/19673* (2013.01); *G06T 2207/10016* (2013.01); *G06T 2207/30168* (2013.01); *G06T 2207/30232* (2013.01)

(56) References Cited

U.S. PATENT DOCUMENTS

| | | | |
|---|---|---|---|
| 6,647,328 B2 | 11/2003 | Walker | |
| 6,711,279 B1 | 3/2004 | Hamza et al. | |
| 6,922,632 B2 | 7/2005 | Foxlia | |
| 7,221,775 B2 | 5/2007 | Buehler | |
| 7,257,237 B1 | 8/2007 | Luck et al. | |
| 7,576,847 B2 | 8/2009 | Bridges | |
| 7,729,511 B2 | 6/2010 | Wohler et al. | |
| 7,768,549 B2 | 8/2010 | Cofer | |
| 7,929,017 B2 * | 4/2011 | Aggarwal | G06K 9/00295 348/169 |
| 8,253,792 B2 | 8/2012 | Wells et al. | |
| 8,260,736 B1 | 9/2012 | Lear et al. | |
| 8,289,390 B2 | 10/2012 | Aggarwal et al. | |
| 8,757,309 B2 | 6/2014 | Schmitt et al. | |
| 8,885,559 B2 | 11/2014 | Schmidt et al. | |
| 9,251,598 B2 | 2/2016 | Wells et al. | |
| 9,256,944 B2 | 2/2016 | Galera et al. | |
| 9,476,730 B2 | 10/2016 | Samarasekera et al. | |
| 9,904,852 B2 | 2/2018 | Divakaran et al. | |
| 9,914,218 B2 | 3/2018 | Ota | |
| 10,394,234 B2 | 8/2019 | Salour | |
| 2002/0196330 A1 * | 12/2002 | Park | G08B 13/19641 348/E7.086 |
| 2005/0078852 A1 * | 4/2005 | Buehler | G06V 20/53 382/103 |
| 2008/0036593 A1 | 2/2008 | Rose-Pehrsson et al. | |
| 2010/0166260 A1 * | 7/2010 | Huang | G06V 20/52 382/103 |
| 2911/0115909 | 5/2011 | Stemberg et al. | |
| 2013/0250050 A1 * | 9/2013 | Kanaujia | H04N 13/106 348/42 |
| 2014/0176726 A1 * | 6/2014 | Millward | G01C 11/02 348/169 |
| 2014/0303767 A1 | 10/2014 | Klumpp et al. | |
| 2015/0153312 A1 | 6/2015 | Gonzalez et al. | |
| 2015/0172545 A1 * | 6/2015 | Szabo | H04N 5/23238 348/36 |
| 2017/0142403 A1 | 5/2017 | Wang et al. | |
| 2017/0280063 A1 * | 9/2017 | Jeon | G06V 20/56 |
| 2017/0313332 A1 | 11/2017 | Paget et al. | |
| 2019/0160938 A1 | 5/2019 | Hart | |

FOREIGN PATENT DOCUMENTS

| | | |
|---|---|---|
| CN | 107505940 A | 12/2017 |
| CN | 109353407 A | 2/2019 |
| WO | WO 98/19875 A1 | 5/1996 |
| WO | WO 00/32462 A1 | 6/2000 |
| WO | WO 2014/149154 A1 | 9/2014 |
| WO | WO 2018/119450 A1 | 6/2018 |
| WO | WO 2019/005727 A1 | 1/2019 |

OTHER PUBLICATIONS

Written Opinion of the International Searching Authority for PCT/AU2020/050113 (PCT/ISA/237) dated Apr. 2, 2020.

International Preliminary Report on Patentability, dated Aug. 26, 2021, and English translation of the Written Opinion of the International Searching Authority, dated Apr. 2, 2020, for International Application No. PCT/AU2020/050113.

International Search Report, issued in PCT/AU2020/050961, dated Sep. 28, 2020.

Written Opinion of the International Search Authority, issued in PCT/AU2020/050961, dated Sep. 28, 2020.

Australian Office Action for Australian Application No. 2020331567, dated Oct. 12, 2021.

International Search Report for International Application No. PCT/AL2020/050961, dated Sep. 28, 2020.

Ito et al., "Small Imaging Depth LIDAR and DCNN-Based Localization for Automated Guided Vehicle," Sensors, vol. 18, No. 177, Jan. 10, 2018, pp. 1-14.

Kandylakis et al., "Multimodal Data Fusion for Effective Surveillance of Critical Infrastructure," The international Archives of the Photogrammetry, Remote Sensing and Spatial Information Sciences, vol. XLII-3/W3, Oct. 2017, pp. 87-93 (7 pages total).

Kelly et al., "An Infrastructure-Free Automated Guided Vehicle Based on Computer Vision." IEEE Robotics & Automation Magazine, Sep. 2007, pp. 24-34 (11 pages total).

Kim et al., "Multi-Object Detection and Behavior Recognition from Motion 3D Data," CVPR 2011 Workshops, 2011, pp. 37-42 (8 pages total).

Olson, "AprilTaq: A robust and fexible visual fiducial system," 2011 IEEE International Conference on Robotics and Automation, 2011, 8 pages.

Tsun et al., "An Improved Indoor Robot Human-Following Navigation Model Using Depth Camera, Active IR Marker and Proximity Sensors Fusion," IEEE Robotics, vol. 7. No. 4, Jan. 6, 2018, pp. 1-23.

Wilkins, "Guiding The Automated Vehicles Industry," IMPO Magazine, Aug. 4, 2017, pp. 1-11.

* cited by examiner

SITUATIONAL AWARENESS MONITORING

BACKGROUND OF THE INVENTION

The present invention relates to a system and method for situational awareness monitoring in an environment, and in one particular example, to a system and method for performing situational awareness monitoring for objects moving within an environment.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Situational awareness is the perception of environmental elements and events with respect to time or space, the comprehension of their meaning, and the projection of their future status. Situational awareness is recognised as important for decision-making in a range of situations, particularly where there is interaction between people and equipment, which can lead to injury, or other adverse consequences. One example of this is within factories, where interaction between people and equipment has the potential for injury or death.

A number of attempts have been made to provide situational awareness monitoring. For example, U.S. Pat. No. 8,253,792 describes a safety monitoring system for a workspace area. The workspace area related to a region having automated moveable equipment. A plurality of vision-based imaging devices capturing time-synchronized image data of the workspace area. Each vision-based imaging device repeatedly capturing a time synchronized image of the workspace area from a respective viewpoint that is substantially different from the other respective vision-based imaging devices. A visual processing unit for analysing the time-synchronized image data. The visual processing unit processes the captured image data for identifying a human from a non-human object within the workspace area. The visual processing unit further determining potential interactions between a human and the automated moveable equipment. The visual processing unit further generating control signals for enabling dynamic reconfiguration of the automated moveable equipment based on the potential interactions between the human and the automated moveable equipment in the workspace area.

However, this system is configured for use with static robots and uses machine vision cameras, which are expensive, and hence unsuitable for wide scale deployment.

In U.S. Pat. No. 7,929,017 a unified approach, a fusion technique, a space-time constraint, a methodology, and system architecture are provided. The unified approach is to fuse the outputs of monocular and stereo video trackers, RFID and localization systems and biometric identification systems. The fusion technique is provided that is based on the transformation of the sensory information from heterogeneous sources into a common coordinate system with rigorous uncertainties analysis to account for various sensor noises and ambiguities. The space-time constraint is used to fuse different sensor using the location and velocity information. Advantages include the ability to continuously track multiple humans with their identities in a large area. The methodology is general so that other sensors can be incorporated into the system. The system architecture is provided for the underlying real-time processing of the sensors.

U.S. Pat. No. 8,289,390 describes a sentient system that combines detection, tracking, and immersive visualization of a cluttered and crowded environment, such as an office building, terminal, or other enclosed site using a network of stereo cameras. A guard monitors the site using a live 3D model, which is updated from different directions using the multiple video streams. As a person moves within the view of a camera, the system detects its motion and tracks the person's path, it hands off the track to the next camera when the person goes out of that camera's view. Multiple people can be tracked simultaneously both within and across cameras, with each track shown on a map display. The track system includes a track map browser that displays the tracks of all moving objects as well as a history of recent tracks and a video flashlight viewer that displays live immersive video of any person that is being tracked.

However, these solutions are specifically configured for tracking of humans and require the presence of stereo video trackers, which are expensive, and hence unsuitable for wide scale deployment.

US 2015/0172545 describes a method for displaying a panoramic view image that includes transmitting video data from a plurality of sensors to a data processor and using the processor to stitch the video data from respective ones of the sensors into a single panoramic image. A focus view of the image is defined and the panoramic image is scrolled such that the focus view is centered in the display. A high resolution camera is aimed along a line corresponding to a center of the focus view of the image and an image produced by the camera is stitched into the panoramic image. A mapping function is applied to the image data to compress the data and thereby reduce at least the horizontal resolution of the image in regions adjacent to the side edges thereof.

WO 2014/149154 describes a monitoring system that integrates multi-domain data from weather, power, cyber, and/or social media sources to greatly increase situation awareness and drive more accurate assessments of reliability, sustainability, and efficiency in infrastructure environments, such as power grids. In one example of the disclosed technology, a method includes receiving real-time data from two or more different domains relevant to an infrastructure system, aggregating the real-time data into a unified representation relevant to the infrastructure system, and providing the unified representation to one or more customizable graphical user interfaces.

SUMMARY OF THE PRESENT INVENTION

In one broad form, an aspect of the present invention seeks to provide a system for situational awareness monitoring within an environment, wherein the system includes one or more processing devices configured to: receive an image stream including a plurality of captured images from each of a plurality of imaging devices, the plurality of imaging devices being configured to capture images of objects within the environment and at least some of the imaging devices being positioned within the environment to have at least partially overlapping fields of view; identify overlapping images in the different image streams, the overlapping images being images captured by imaging devices having overlapping fields of view; analyse the overlapping images to determine object locations within the environment; analyse changes in the object locations over time to determine object movements within the environment; compare the object movements to situational awareness rules; and, use results of the comparison to identify situational awareness events.

In one embodiment the overlapping images are synchronous overlapping images captured at approximately the same time.

In one embodiment the one or more processing devices are configured to: determine a capture time of each captured image; and, identify synchronous images using the captured time.

In one embodiment the one or more processing devices are configured to determine a capture time using at least one: a capture time generated by the imaging device; a receipt time associated with each image, the receipt time being indicative of a time of receipt by the one or more processing devices; and, a comparison of image content in the images.

In one embodiment the one or more processing devices are configured to: analyse images from each image stream to identify object images, the object images being images including objects; and, identify overlapping images as object images that include the same object.

In one embodiment the one or more processing devices are configured to identify overlapping images based at least in part on a positioning of the imaging devices.

In one embodiment the one or more processing devices are configured to: analyse a number of images from an image stream to identify static image regions; and, identifying object images as images including non-static image regions.

In one embodiment at least one of the images is a background reference image.

In one embodiment the one or more processing devices are configured to: determine a degree of change in appearance for an image region between images in an image stream; and, identify objects at least in part based on the degree of change.

In one embodiment the one or more processing devices are configured to: compare the degree of change to a classification threshold; classify the image region based on results of the comparison; and, identify objects based on classification of the image region.

In one embodiment the one or more processing devices are configured to classify the image region: as a static image region if the degree of change is below the classification threshold; or as a non-static image region if the degree of change is above the classification threshold.

In one embodiment the one or more processing devices are configured to analyse non-static image regions to identify objects.

In one embodiment the one or more processing devices are configured to dynamically adjust the classification threshold.

In one embodiment the one or more processing devices are configured to: identify an object image region containing an object that has stopped moving; and, modify the classification threshold for the object image region so as to decrease the degree of change required in order to classify the image region as a non-static image region.

In one embodiment the one or more processing devices are configured to: identify images including visual effects; and, process the images in accordance with the visual effects to thereby identify objects.

In one embodiment the one or more processing devices are configured to: identify image regions including visual effects; and, at least one of: exclude image regions including visual effects; and, classify image regions accounting for the visual effects.

In one embodiment the one or more processing devices are configured to adjust a classification threshold based on identified visual effects.

In one embodiment the one or more processing devices are configured to identify visual effects at least one of: using signals from one or more illumination sensors; using one or more reference images; in accordance with environmental information; based on manual identification of illumination regions; and, by analyzing images in accordance with defined illumination properties.

In one embodiment the one or more processing devices are configured to determine an object location using at least one of: a visual hull technique; and, detection of fiducial markings in the images; and, detection of fiducial markings in multiple triangulated images.

In one embodiment the one or more processing devices are configured to: identify corresponding image regions in overlapping images, the corresponding images being images of a volume within the environment; and, analyse the corresponding image regions to identify objects in the volume.

In one embodiment the corresponding image regions are non-static image regions.

In one embodiment the one or more processing devices are configured to: analyse corresponding image regions to identify candidate objects; generate a model indicative of object locations in the environment; analyse the model to identify potential occlusions; and, use the potential occlusions to validate candidate objects.

In one embodiment the one or more processing devices are configured to: classify image regions as occluded image regions if they contain potential occlusions; and, use the identified occluded image regions to validate candidate objects.

In one embodiment the one or more processing devices are configured to analyse the corresponding image regions excluding occluded image regions.

In one embodiment the one or more processing devices are configured to: calculate an object score associated with corresponding image regions, the object score being indicative of a certainty associated with detection of an object in the corresponding image regions; and, using the object score to identify objects.

In one embodiment the one or more processing devices are configured to: generate an image region score for each of the corresponding image regions; and, at least one of: calculate an object score using the image region scores; analyse the corresponding image regions to identify objects in the volume in accordance with the image region score of each corresponding image region; and, perform a visual hull technique using the image region score of each corresponding image region as a weighting.

In one embodiment the image region score is based on at least one of: an image region classification; a longevity of an image region classification; historical changes image region classification; a presence or likelihood of visual effects; a degree of change in appearance for an image region between images in an image stream; a camera geometry relative to the image region; a time of image capture; and, an image quality.

In one embodiment the one or more processing devices are configured to interpret the images in accordance with calibration data.

In one embodiment the calibration data includes at least one of: intrinsic calibration data indicative of imaging properties of each imaging device; and, extrinsic calibration data indicative of relative positioning of the imaging devices within the environment.

In one embodiment the one or more processing devices are configured to generate calibration data during a calibration process by: receiving images of defined patterns captured from different positions using an imaging device; and, analysing the images to generate calibration data indicative of a image capture properties of the imaging device.

In one embodiment the one or more processing devices are configured to generate calibration data during a calibration process by: receiving captured images of targets within the environment; analysing the captured images to identify images captured by different imaging devices which show the same target; and, analysing the identified images to generate calibration data indicative of a relative position and orientation of the imaging devices.

In one embodiment the one or more processing devices are configured to: determine an object identity for at least one object; and, compare the object movement to the situation awareness rules at least in part using the object identity.

In one embodiment the object identity is at least one of: indicative of an object type; and, uniquely indicative of the object.

In one embodiment the one or more processing devices are configured to: select one or more situational awareness rules in accordance with the object identity; and, compare the object movement to the selected situational awareness rules.

In one embodiment the one or more processing devices are configured to determine the object identity by analysing movement patterns.

In one embodiment the one or more processing devices are configured to determine the object identity using image recognition.

In one embodiment an object is associated with machine readable coded data indicative of an object identity, and wherein the one or more processing devices are configured to determine the object identity using the machine readable coded data.

In one embodiment the machine readable coded data is visible data, and wherein the one or more processing devices are configured to analyse the images to detect the machine readable coded data.

In one embodiment the machine readable coded data is encoded on a tag associated with the object, and wherein the one or more processing devices are configured to receive signals indicative of the machine readable coded data from a tag reader.

In one embodiment the tags at least one of: short range wireless communications protocol tags; RFID tags; and, Bluetooth tags.

In one embodiment the one or more processing devices are configured to: use object movements to determine predicted object movements; and, compare the predicted object movements to the situation awareness rules.

In one embodiment the object movement represents an object travel path.

In one embodiment the situation awareness rules are indicative of at least one of: permitted object travel paths; permitted object movements; permitted proximity limits for different objects; permitted zones for objects; denied zones for objects.

In one embodiment the one or more processing devices are configured to identify situational awareness events if at least one of: an object movement deviates from a permitted object travel path defined for the object; an object movement deviates from a permitted object movement for the object; two objects are within permitted proximity limits for the objects; two objects are approaching permitted proximity limits for the objects; two objects are predicted to be within permitted proximity limits for the objects; two objects have intersecting predicted travel paths; an object is outside a permitted zone for the object; an object is exiting a permitted zone for the object; an object is inside a denied zone for the object; and, an object is entering a denied zone for the object.

In one embodiment the one or more processing devices are configured to generate an environment model, the environment model being indicative of at least one of: the environment; a location of imaging devices in the environment; current object locations; object movements; predicted object locations; and, predicted object movements.

In one embodiment the one or more processing devices are configured to generate a graphical representation of the environment model.

In one embodiment in response to identification of a situational awareness event, the one or more processing devices are configured to at least one of: record an indication of the situational awareness event; generate a notification indicative of the situational awareness event; cause an output device to generate an output indicative of the situational awareness event; activate an alarm; and, cause operation of an object to be controlled.

In one embodiment the imaging devices are at least one of: security imaging devices; monoscopic imaging devices; non-computer vision based imaging devices; and, imaging devices that do not have associated intrinsic calibration information.

In one embodiment the objects including at least one of: people; items; remotely controlled vehicles; manually controlled vehicles; semi-autonomous vehicles; autonomous vehicles; and, automated guided vehicles.

In one embodiment the one or more processing devices are configured to: identify the situational awareness event substantially in real time; and, perform an action substantially in real time.

In one broad form, an aspect of the present invention seeks to provide a method for situational awareness monitoring within an environment, wherein the method includes, in one or more processing devices: receiving an image stream including a plurality of captured images from each of a plurality of imaging devices, the plurality of imaging devices being configured to capture images of objects within the environment and at least some of the imaging devices being positioned within the environment to have at least partially overlapping fields of view; identifying overlapping images in the different image streams, the overlapping images being images captured by imaging devices having overlapping fields of view; analysing the overlapping images to determine object locations within the environment; analysing changes in the object locations over time to determine object movements within the environment; comparing the object movements to situational awareness rules; and, using results of the comparison to identify situational awareness events.

In one broad form, an aspect of the present invention seeks to provide a computer program product for use in situational awareness monitoring within an environment, wherein the computer program product includes computer executable code, which when executed by one or more suitably programmed processing devices, causes the processing devices to: receive an image stream including a plurality of captured images from each of a plurality of imaging devices, the plurality of imaging devices being configured to capture images of objects within the environment and at least some of the imaging devices being positioned within the environment to have at least partially overlapping fields of view; identify overlapping images in the different image streams, the overlapping images being images captured by imaging devices having overlapping fields of view at approximately the same time; analyse the overlapping images to determine object locations within the environment; analyse changes in the object locations over time to determine object movements within the environment; compare the object movements to situational awareness rules; and, use results of the comparison to identify situational awareness events.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:—

DETAILED DESCRIPTION OF THE PREFERRED EMBODIMENTS

Figure 1:
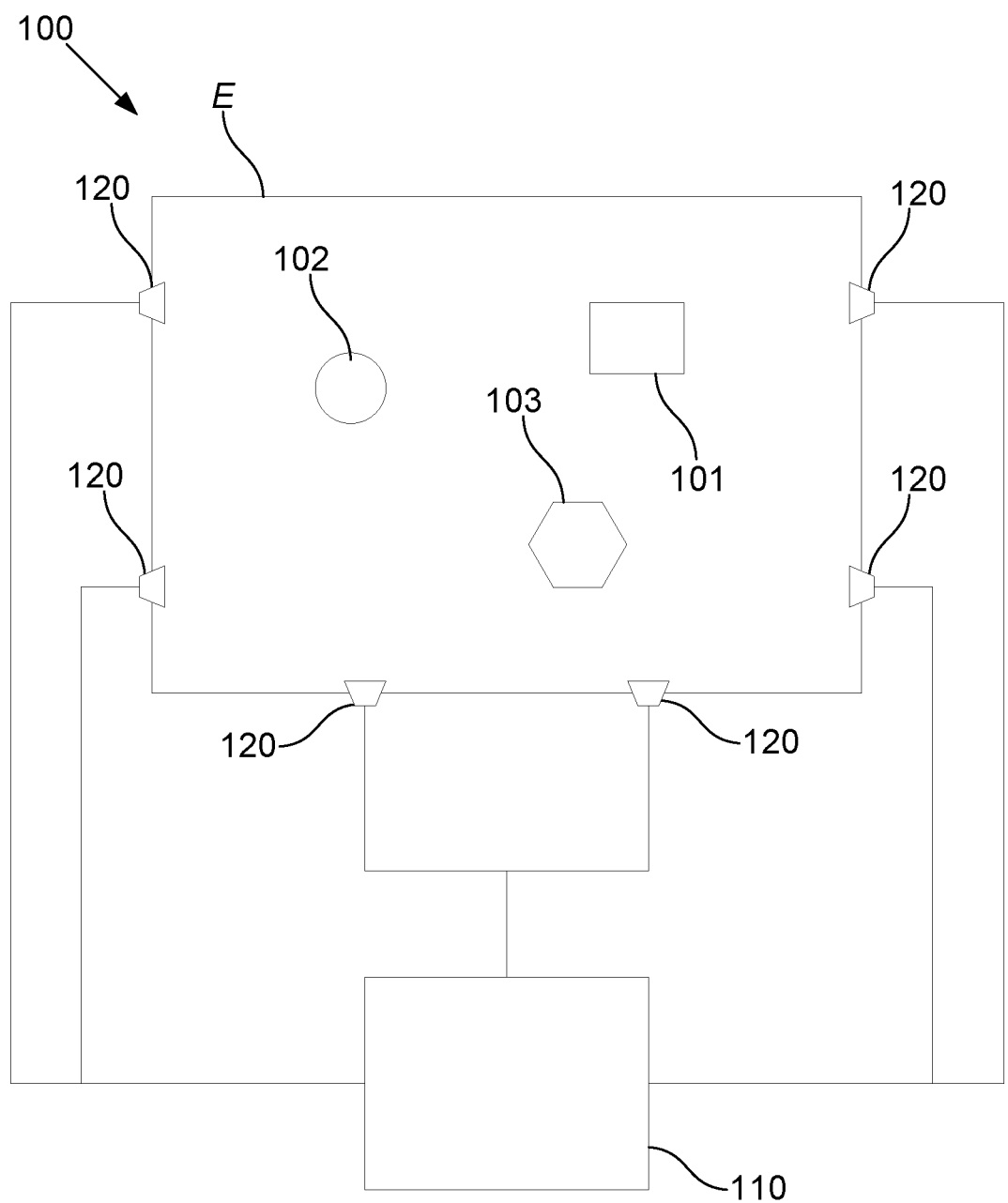
FIG. 1 is a schematic diagram of an example of a system for situational awareness monitoring within an environment.

An example of a system for performing situational awareness monitoring within an environment will now be described with reference to FIG. 1.

In this example, situational awareness monitoring is performed within an environment E where one or more objects 101, 102, 103 are present. Whilst three objects are shown in the current example, this is for the purpose of illustration only and the process can be performed with any number of objects.

The nature of the environment E can vary depending upon the preferred implementation and could include any space where situational awareness monitoring needs to be performed. Particular examples include factories, warehouses, storage environments, or similar, although it will be appreciated that the techniques could be applied more broadly, and could be used in indoor and/or outdoor environments. Similarly, the objects could be a wide variety of objects, and in particular moving objects, such as people, animals, vehicles, autonomous or semiautonomous vehicles, such as automated guided vehicles (AGVs), or the like. In one particular example, situational awareness monitoring is particularly beneficial in situations where AGVs, or other robotic systems or vehicles, are working alongside people, such as in semi-automated factories. Again however this is not intended to be limiting.

The system for performing situational awareness monitoring typically includes one or more electronic processing devices 110, configured to receive image streams from imaging devices 120, which are provided in the environment E in order to allow images to be captured of the objects 101, 102, 103 within the environment E.

For the purpose of illustration, it is assumed that the one or more electronic processing devices form part of one or more processing systems, such as computer systems, servers, or the like, which may be connected to one or more client devices, such as mobile phones, portable computers, tablets, or the like, via a network architecture, as will be described in more detail below. Furthermore, for ease of illustration the remaining description will refer to a processing device, but it will be appreciated that multiple processing devices could be used, with processing distributed between the processing devices as needed, and that reference to the singular encompasses the plural arrangement and vice versa.

The nature of the imaging devices 120 will vary depending upon the preferred implementation, but in one example the imaging devices are low cost imaging devices, such as non-computer vision monoscopic cameras. In one particular example, security cameras can be used, although as will become apparent from the following description, other low cost cameras, such as webcams, or the like, could additionally and/or alternatively be used. It is also possible for a wide range of different imaging devices 120 to be used, and there is no need for the imaging devices 120 to be of a similar type or model.

The imaging devices 120 are typically positioned so as to provide coverage over a full extent of the environment E, with at least some of the cameras including at least partially overlapping fields of view, so that any objects within the environment E are preferably imaged by two or more of the imaging devices at any one time. The imaging devices are typically statically positioned within the environment and may be provided in a range of different positions in order to provide complete coverage. For example, the imaging devices could be provided at different heights, and could include a combination of floor, wall and/or ceiling mounted cameras, configured to capture views of the environment from different angles.

Figure 2:
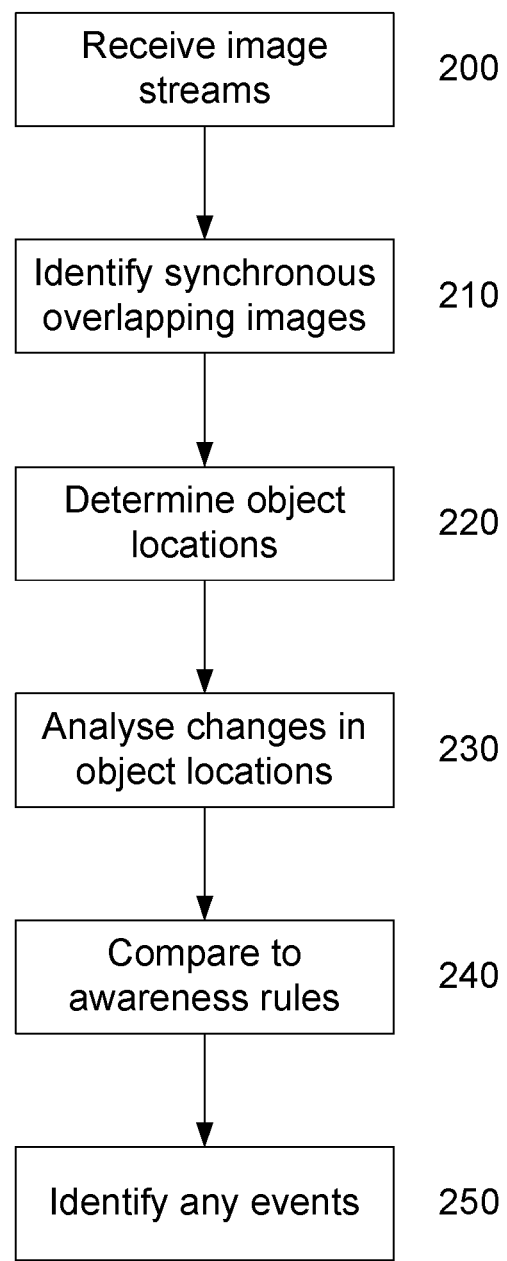
FIG. 2 is a flowchart of an example of a method for situational awareness monitoring within an environment.

Operation of the system will now be described in more detail with reference to FIG. 2.

In this example, at step 200, the processing device 110 receives image streams from each of the imaging devices

120, with the image streams including a plurality of captured images, and including images of the objects 101, 102, 103, within the environment E.

At step 210, the processing device 110 identifies overlapping images in the different image streams. In this regard, the overlapping images are overlapping images captured by imaging devices that have overlapping fields of view, so that an image of an object is captured from at least two different directions by different imaging devices. Additionally, the overlapping fields of view are typically determined based on knowledge of the relative location of the imaging devices 120 within the environment E, although alternatively this could be achieved using analysis of the images, as will be described in more detail below.

At step 220 the one or more processing devices analyse the overlapping images to determine object locations within the environment. Specifically, the images are analysed to identify a position of an object in the different overlapping images, with knowledge of the imaging device locations being used to triangulate the position of the object. This can be achieved utilising any appropriate technique and in one example is achieved utilising a visual hull approach, as described for example in A. Laurentini (February 1994). "The visual hull concept for silhouette-based image understanding". IEEE Trans. Pattern Analysis and Machine Intelligence. pp. 150-162. However, other approaches, such image analysis of fiducial markings, can also be used. In one preferred example, fiducial markings are used in conjunction with the overlapping images, so that the object location can be determined with a higher degree of accuracy, although it will be appreciated that this is not essential.

At step 230, the one or more processing devices analyse changes in the object locations over time to determine object movements corresponding to movement of the objects 101, 102, 103 within the environment E. Specifically, sequences of overlapping images are analysed to determine a sequence of object locations, with the sequence of object locations being utilised in order to determine movement of each object 101, 102, 103. The object movements could be any form of movement, but in one example are travel paths of the objects 101, 102, 103 within the environment E.

At step 240, object movements are compared to situational awareness rules. The situational awareness rules define criteria representing desirable and/or potentially hazardous or other undesirable movement of objects 101, 102, 103 within the environment E. The nature of the situational awareness rules and the criteria will vary depending upon factors, such as the preferred implementation, the circumstances in which the situational awareness monitoring process is employed, the nature of the objects being monitored, or the like. For example, the rules could relate to proximity of objects, a future predicted proximity of objects, interception of travel paths, certain objects entering or leaving particular areas, or the like, and examples of these will be described in more detail below.

At step 250 results of the comparison are used to identify any situational awareness events arising, which typically correspond to non-compliance or potential non-compliance with the situational awareness rules. Thus, for example, if a situational awareness rule is breached, this could indicate a potential hazard, which can, in turn, be used to allow action to be taken. The nature of the action and the manner in which this is performed will vary depending upon the preferred implementation.

For example, the action could include simply recording details of the situational awareness event, allowing this to be recorded for subsequent auditing purposes. Additionally, and/or alternatively, action can be taken in order to try and prevent hazardous situations, for example to alert individuals by generating a notification or an audible and/or visible alert. This can be used to alert individuals within the environment so that corrective measures can be taken, for example by having an individual adjust their current movement or location, for example to move away from the path of an AGV. Additionally, in the case of autonomous or semi-autonomous vehicles, this could include controlling the vehicle, for example by instructing the vehicle to change path or stop, thereby preventing accidents occurring.

Accordingly, it will be appreciated that the above described arrangement provides a system for monitoring environments such as factories, warehouses, mines or the like, allowing movement of objects such as AGVs, people, or other objects, to be tracked. This is used together with situational awareness rules to establish when undesirable conditions arise, such as when an AGV or other vehicle is likely to come into contact or approach a person, or vice versa. In one example, the system allows corrective actions to be performed automatically, for example to modify operation of the vehicle, or alert a person to the fact that a vehicle is approaching.

To achieve this, the system utilises a plurality of imaging devices provided within the environment E and operates to utilise images with overlapping fields of view in order to identify object locations. This avoids the need for objects to be provided with a detectable feature, such as RFID tags, or similar, although the use of such tags is not excluded as will be described in more detail below. Furthermore, this process can be performed using low cost imaging devices, such as security cameras, or the like to be used, which offers a significant commercial value over other systems. The benefit is that the cameras are more readily available, known well and have a lower cost as well as can be connected to a single Ethernet cable that communicates and supplies power. This can then connect to a standard off the shelf POE Ethernet Switch as well as standard Power supply regulation. Thus, this can vastly reduce the cost of installing and configuring such a system, avoiding the need to utilise expensive stereoscopic or computer vision cameras and in many cases allows existing security camera infrastructure to be utilised for situational awareness monitoring.

Additionally, the processing device can be configured to perform the object tracking, identification of situational awareness events, or actions, substantially in real time. Thus, for example, the time taken between image capture and an action being performed can be less than about 1 second, less than about 500 ms, less than about 200 ms, or less than about 100 ms. This enables the system to effectively alert individuals within the environment and/or take corrective action, for example by controlling vehicles, thereby allowing events, such as impacts or injuries to be avoided.

A number of further features will now be described.

In one example, the overlapping images are synchronous overlapping images in that they are captured at approximately the same time. In this regard, the requirement for images to be captured at approximately the same time means that the images are captured within a time interval less than that which would result in substantial movement of the object. Whilst this will therefore be dependent on the speed of movement of the objects, the time interval is typically less than about 1 second, less than about 500 ms, less than about 200 ms, or less than about 100 ms.

In order to identify synchronous overlapping images, the processing device is typically configured to synchronise the image streams, typically using information such as a timestamp associated with the images and/or a time of receipt of the images from the imaging device. This allows images to be received from imaging devices other than computer vision devices, which are typically time synchronised with the processing device. Thus, this requires additional functionality to be implemented by the processing device in order to ensure accurate time sync between all of the camera feeds which is normally performed in hardware.

In one example, the processing devices are configured to determine a captured time of each captured image, and then identify the synchronous images using the captured time. This is typically required because the imaging devices do not incorporate synchronisation capabilities, as present in most computer vision cameras, allowing the system to be implemented using cheaper underlying and existing technologies, such as security cameras, or the like.

The manner in which a capture time is determined for each captured image will vary depending upon the preferred implementation. For example, the imaging device may generate a captured time, such as a time stamp, as is the case with many security cameras. In this case, by default the time stamp can be used as the capture time. Additionally and/or alternatively, the captured time could be based on a receipt time indicative of a time of receipt by the processing device. This might optionally take into account a communication delay between the imaging device and the processing device, which could be established during a calibration, or other set up process. In one preferred example, the two techniques are used in conjunction, so that the time of receipt of the images is used to validate a time stamp associated with the images, thereby providing an additional level of verification to the determined capture time, and allowing corrective measures to be taken in the event a capture time is not verified.

However, it will be appreciated that the use of synchronous images is not essential, and asynchronous images or other data could be used, depending on the preferred implementation. For example, images of an object that are captured asynchronously can result in the object location changing between images. However, this can be accounted for through suitable techniques, such as weighting images, so images captured asynchronously are given a temporal weighting in identifying the object location, as will be described in more detail below. Other techniques could also be employed such as assigning an object a fuzzy boundary and/or location, or the like.

In one example, the processing devices are configured to analyse images from each image stream to identify object images, which are images including objects. Having identified object images, these can be analysed to identify overlapping images as object images that include an image of the same object. This can be performed on the basis of image recognition processes but more typically is performed based on knowledge regarding the relative position, and in particular fields of view, of the imaging devices. This may also take into account for example a position of an object within an image, which could be used to narrow down overlapping fields of view between different imaging devices to thereby locate the overlapping images. Such information can be established during a calibration process as will be described in more detail below.

In one example, the one or more processing devices are configured to analyse a number of images from an image stream to identify static image regions and then identify object images as images including non-static image regions. In particular, this involves comparing successive or subsequent images to identify movement that occurs between the images, with it being assessed that the movement component in the image is as a result of an object moving. This relies on the fact that the large majority of the environment will remain static, and that in general it is only the objects that will undergo movement between the images. Accordingly, this provides an easy mechanism to identify objects, and reduces the amount of time required to analyse images to detect objects therein.

It will be appreciated that in the event that an object is static, it may not be detected by this technique if the comparison is performed between successive images. However, this can be addressed by applying different learning rates to background and foreground. For example, background reference images could be established in which no objects are present in the environment, with the subtraction being performed relative to the background reference images, as opposed to immediately preceeding images. In one preferred approach, the background reference images are periodically updated to take into account changes in the environment. Accordingly, this approach allows stationary objects to be identified or tracked. It will also be appreciated that tracking of static objects can be performed utilising an environment model that maintains a record of the location of static objects so that tracking can resume when the object recommences movement, as will be described in more detail below.

Thus, the one or more processing devices can be configured to determine a degree of change in appearance for an image region between images in an image stream and then identify objects based on the degree of change. The images can be successive images and/or temporally spaced images, with the degree of change being a magnitude and/or rate of change. The size and shape of the image region can vary, and may include subsets of pixels, or similar, depending on the preferred implementation. In any event, it will be appreciated that if the image region is largely static, then it is less likely that an object is within the image region, than if the image region is undergoing significant change in appearance, which is indicative of a moving object.

In one particular example, this is achieved by classifying image regions as static or non-static image regions (also referred to as background and foreground image regions), with the non-static image regions being indicative of movement, and hence objects, within the environment. The classification can be performed in any appropriate manner, but in one example, this is achieved by comparing a degree of change to a classification threshold and then classifying the image region based on results of the comparison, for example classifying image regions as non-static if the degree of change exceeds the classification threshold, or static if the degree of change is below the classification threshold.

Following this, objects can be identified based on classification of the image region, for example by analysing non-static image regions to identify objects. In one example, this is achieved by using the image regions to establish masks, which are then used in performing subsequent analysis, for example, with foreground masks being used to identify and track objects, whilst background masks are excluded to reduce processing requirements.

Additionally, in order to improve discrimination, the processing device can be configured to dynamically adjust the classification threshold, for example to take into account changes in object movement, environmental effects or the like.

For example, if an object ceases moving, this can result in the image region being reclassified as static, even though it contains an object. Accordingly, in one example, this can be accounted for by having the processing device identify an object image region containing an object that has previously been moving, and then modifying the classification threshold for the object image region so as to decrease the degree of change required in order to classify the image region as a non-static image region. This in effect changes the learning rate for the region as mentioned above. As changes in the appearance of the image region can be assessed cumulatively, this in effect can increase the duration from when movement within a region stops to the time at which the region is classified as a static image region, and hence is assessed as not containing an object. As a result, if an object stops moving for a relatively short period of time, this avoids the region being reclassified, which can allow objects to be tracked more accurately.

In another example, the processing devices can be configured to identify images including visual effects and then process the images in accordance with the visual effects to thereby identify objects. In this regard, visual effects can result in a change of appearance between images of the same scene, which could therefore be identified as a potential object. For example, an AGV may include illumination ahead of the vehicle, which could be erroneously detected as an object separate from the AGV as it results in a change in appearance that moves over time. Similar issues arise with other changes in ambient illumination, such as changes in sunlight within a room, the presence of visual presentation devices, such as displays or monitors, or the like.

In one example, to address visual effects, the processing device can be configured to identify image regions including visual effects and then exclude image regions including visual effects and/or classify image regions accounting for the visual effects. Thus, this could be used to adjust a classification threshold based on identified visual effects, for example by raising the classification threshold so that an image region is less likely to be classified as a non-static image region when changes in visual appearance are detected.

The detection of visual effects could be achieved using a variety of techniques, depending on the preferred implementation, available sensors and the nature of the visual effect. For example, if the visual effect is a change in illumination, signals from one or more illumination sensors could be used to detect the visual effect. Alternatively, one or more reference images could be used to identify visual effects that routinely occur within the environment, such as to analyse how background lighting changes during the course of a day, allowing this to be taken into account. This could also be used in conjunction with environmental information, such as weather reports, information regarding the current time of day, or the like, to predict likely illumination within the environment. As a further alternative, manual identification could be performed, for example by having a user specify parts of the environment that could be subject to changes in illumination and/or that contain monitors or displays, or the like.

In another example, visual effects could be identified by analyzing images in accordance with defined properties thereby allowing regions meeting those properties to be excluded. For example, this could include identifying illumination having known wavelengths and/or spectral properties, such as corresponding to vehicle warning lights, and then excluding such regions from analysis.

In general, the processing device is configured to analyse the synchronous overlapping images in order to determine object locations. In one example, this is performed using a visual hull technique, which is a shape-from-silhouette 3D reconstruction technique. In particular, such visual hull techniques involve identifying silhouettes of objects within the images, and using these to create a back-projected generalized cone (known as a "silhouette cone") that contains the actual object. Silhouette cones from images taken from different viewpoints are used to determine an intersection of the two or more cones, which forms the visual hull, which is a bounding geometry of the actual 3D object. This can then be used to ascertain the location based on known viewpoints of the imaging devices. Thus, comparing images captured from different viewpoints allows the position of the object within the environment E to be determined.

However, in some examples, such a visual hull approach is not required. For example, if the object includes machine readable visual coded data, such as a fiducial marker, or an April Tag, described in "AprilTag: A robust and flexible visual fiducial system" by Edwin Olson in Proceedings of the IEEE International Conference on Robotics and Automation (ICRA), 2011, then the location can be derived through a visual analysis of the fiducial markers in the captured images.

In one preferred example, the approach uses a combination of fiducial markings and multiple images, allowing triangulation of different images containing the fiducial markings, to allowing the location of the fiducial markings and hence the object, to be calculated with a higher degree of accuracy.

In one example, particularly when using visual hull or similar techniques, the processing device can be configured to identify corresponding image regions in overlapping images, which are images of a volume within the environment, and then analyse the corresponding image regions to identify objects in the volume. Specifically, this typically includes identifying corresponding image regions that are non-static image regions of the same volume that have been captured from different points of view. The non-static regions can then be analysed to identify candidate objects, for example using the visual hull technique.

Whilst this process can be relatively straightforward when there is a sufficiently high camera density, and/or objects are sparsely arranged within the environment, this process becomes more complex when cameras are sparse and/or objects densely arranged and/or are close to each other. In particular, in this situation, objects are often wholly or partially occluded, meaning the shape of the object may not be accurately captured using some of the imaging devices. This can in turn lead to misidentification of objects, or their size, shape or location.

Accordingly, in one example, once candidate objects have been identified, these can be incorporated into a three dimensional model of the environment, and examples of such a model are described in more detail below. The model can then be analysed to identify potential occlusions, for example when another object is positioned between the object and an imaging device, by back-projecting objects from the three dimensional model into the 2D imaging plane of the imaging device. Once identified, the potential occlusions can then be used to validate candidate objects, for example allowing the visual hull process to be performed taking the occlusion into account. Examples of these issues are described in "Visual Hull Construction in the Presence of Partial Occlusion" by Li Guan, Sudipta Sinha, Jean-Sebastien Franco, Marc Pollefeys.

In one example, the potential occlusions are accounted for by having the processing device classify image regions as occluded image regions if they contain potential occlusions, taking this into account when identifying the object. Whilst this could involve simply excluding occluded image regions from the analysis, typically meaningful information would be lost with this approach, and as a result objects may be inaccurately identified and/or located. Accordingly, in another example, this can be achieved by weighting different ones of the corresponding images, with the weighting being used to assess the likely impact of the occlusion and hence the accuracy of any resulting object detection.

A similar weighting process can also be used to take other issues into account. Accordingly, in one example, an object score is calculated associated with corresponding image regions, with the object score being indicative of certainty associated with detection of an object in the corresponding image regions. Once calculated the object score can be used to identify objects, for example assessing an object to be accurately identified if the score exceeds a score threshold.

It will be appreciated that the object score could be used in a variety of manners. For example, if an object score is too low, an object could simply be excluded from the analysis. More usefully however, this could be used to place constraints on how well known is the object location, so that a low score could result in the object having a high degree of uncertainty on the location, allowing this to be taken into account when assessing situational awareness.

In one example, the object score is calculated by generating an image region score for each of the corresponding image regions and then calculating the object score using the image region scores for the image regions of each of the corresponding images. Thus image region scores are calculated for each imaging device that captures an image region of a particular volume, with these being combined to create an overall score for the volume.

Additionally and/or alternatively, the individual image region scores could be used to assess the potential reliability for an image region to be used in accurately identifying an object. Thus if the likely accuracy of any particular image region is low, such as if there is a significant occlusion, or the like, this could be given a low weighting in any analysis, so it is less likely to adversely impact on the subsequent analysis, thereby reducing the chance of this unduly influencing the resulting object location.

As mentioned, whilst this approach could be used for occlusions, this could also be used for a wide range of other factors. For example, the score could be based on an image region classification, or a degree of change in appearance for an image region between images in an image stream, so that static image regions that are unlikely to contain an object have a low score, whereas non-static regions could have a higher score.

Similarly, this approach could take into account longevity of an image region classification or historical changes image region classification. Thus, if the classification of an image region changes frequently, this might suggest the region is not being correctly classified, and hence this could be given a low confidence score, whereas a constant classification implies a higher confidence in correct classification and hence a higher score.

Similarly, a score could be assigned based on a presence or likelihood of visual effects, allowing visual effects to be accounted for when identifying objects. In another example, a camera geometry relative to the volume of interest could be used, so that images captured by a camera that is distant from, or obliquely arranged relative to, a volume are given a lower weighting.

The factors could also take into account a time of image capture, which can assist in allowing asynchronous data capture to be used. In this instance, if one of the overlapping images is captured at a significantly different time to the other images, this may be given a lower weighting in terms of identifying the object given the object may have moved in the intervening time.

Similarly, other factors relating to image quality, such as resolution, focus, exposure, or the like, could also be taken into account.

Accordingly, it will be appreciated that calculating a score for the image captured by each imaging device could be used to weight each of the images, so that the degree to which the image is relied upon in the overall object detection process can take into account factors such as the quality of the image, occlusions, visual effects, how well the object is imaged, or the like, which can in turn allow object detection to be performed more accurately.

Irrespective of how objects are detected, determining the location of the objects typically requires knowledge of the positioning of the imaging devices within the environment, and so the processing device is configured to interpret the images in accordance with a known position of the image devices. To achieve this, in one example, position information is embodied in calibration data which is used in order to interpret the images. In one particular example, the calibration data includes intrinsic calibration data indicative of imaging properties of each imaging device and extrinsic calibration data indicative of the relative positioning of the imaging devices within the environment E. This allows the processing device to correct images to account for any imaging distortion in the captured images, and also to account for the position of the imaging devices relative to the environment E.

The calibration data is typically generated during a calibration process. For example, intrinsic calibration data can be generated based on images of defined patterns captured from different positions using an imaging device. The defined patterns could be of any appropriate form and may include patterns of dots or similar, fiducial markers, or the like. The images are analysed to identify distortions of the defined patterns in the image, which can in turn be used to generate calibration data indicative of image capture properties of the imaging device. Such image capture properties can include things such as a depth of field, a lens aperture, lens distortion, or the like.

In contrast, extrinsic calibration data can be generated by receiving captured images of targets within the environment, analysing the captured images to identify images captured by different imaging devices which show the same target and analysing the identified images to generate calibration data indicative of a relative position and orientation of the imaging devices. Again this process can be performed by positioning multiple targets within the environment and then identifying which targets have been captured using which imaging devices. This can be performed manually, based on user inputs, or can be performed automatically using unique targets so that different targets and different positions can be easily identified. It will be appreciated from this that fiducial markers, such as April Tags could be used for this purpose.

The nature of the situational awareness rules will vary depending on the preferred implementation, as well as the nature of the environment, and the objects within the environment. In one example, the situational awareness rules are indicative of one or more of permitted object travel paths, permitted object movements, permitted proximity limits for different objects, permitted zones for objects, or denied zones of objects. In this example, situational awareness events could be determined to occur if an object movement deviates from a permitted object travel path, if object movement deviates from a permitted object movement, if two objects are within a predetermined proximity limit for the objects, if two objects are approaching permitted proximity limits for the objects, if two objects have intersecting predicted travel paths, if an object is outside a permitted zone for the object, if an object is exiting a permitted zone for the object, if an object is inside a denied zone for the object, if an object is entering a denied zone for the object, or the like. It will be appreciated however that a wide range of different situational awareness rules could be defined to identify a wide range of different situational awareness events, and that the above examples are for the purpose of illustration only.

Such rules can be generated using a variety of techniques, but are typically generated manually through an understanding of the operation and interaction of objects in the environment. In another example, a rules engine can be used to at least partially automate the task. The rules engine typically operates by receiving a rules document, and parsing using natural language processing, to identify logic expressions and object types. An object identifier is then determined for each object type, either by retrieving these based on an object type of the object or by generating these as needed. The logic expressions are then used to generate the object rules by converting the logic expressions into a trigger event and an action, before uploading these to the tag. For example, the logic expressions are often specified within a rules text in terms of "If . . . then . . . " statements, which can be converted to a trigger and action. This can be performed using templates, for example by populating a template using text from the "If . . . then . . . " statements, so that the rules are generated in a standard manner, allowing these to be interpreted consistently.

Once rules are generated, actions to be taken in response to a breach of the rules can also be defined, with this information being stored as rules data in a rules database.

It will be appreciated from the above that different rules are typically defined for different objects and/or object types. Thus, for example, one set of rules could be defined for individuals, whilst another set of rules might be defined for AGVs. Similarly, different rules could be defined for different AGVs which are operating in a different manner. It will also be appreciated that in some instances rules will relate to interaction between objects, in which case the rules may depend on the object identity of multiple objects.

Accordingly, in one example, when the rules are created, the rules are associated with one or more object identities, which can be indicative of an object type and/or can be uniquely indicative of the particular object, allowing object situational awareness rules to be defined for different types of objects, or different individual objects. This allows the processing device to subsequently retrieve relevant rules based on the object identities of objects within the environment. Accordingly, in one example, the one or more processing devices are configured to determine an object identity for at least one object and then compare the object movement to situational awareness rules at least in part using the object identity. Thus, the processing device can select one or more situational awareness rules in accordance with the object identity, and then compare the object movement to the selected situational awareness rule.

The object identity can be determined utilising a number of different techniques, depending for example on the preferred implementation, and/or, the nature of the object. For example, if the object does not include any form of encoded identifier, this could be performed using image recognition techniques. In the case of identifying people for example, the people will have a broadly similar appearance will generally be quite different to that of an AGV and accordingly, people could be identified using image recognition techniques performed on or more of the images. It will be noted that this does not necessarily require discrimination of different individuals, although this may be performed in some cases.

Additionally and/or alternatively, identities, and in particular object types could be identified through an analysis of movement. For example movement of AGVs will typically tend to follow predetermined patterns and/or have typically characteristics such as constant speed and/or direction changes. In contrast to this movement of individuals will tend to be more haphazard and subject to changes in direction and/or speed allowing, AGVs and humans to be distinguished based on an analysis of movement patterns.

In another example, an object can be associated with machine readable code data indicative of an object identity. In this example, the processing devices can be configured to determine the object identity using the machine readable coded data. The machine readable coded data could be encoded in any one of a number of ways depending on the preferred implementation. In one example, this can be achieved using visual coded data such as a bar code, QR code or more typically an April Tag, which can then be detected by analysing images to identify the visible machine readable coded data in the image allowing this to be decoded by the processing device. In another example however objects may be associated with tags, such as short range wireless communication protocol tags, RFID (Radio Frequency Identification) tags, Bluetooth tags, or similar, in which case the machine readable coded data could be retrieved from a suitable tag reader.

It will also be appreciated that identification approaches could be used in conjunction. For example, an object could be uniquely identified through detection of machine readable coded data when passing by a suitable reader. In this instance, once the object has been identified, this identity can be maintained by keeping track of the object as it moves within the environment. This means that the object does not need to pass by a reader again in order to be identified, which is particularly useful in circumstances where objects are only identified on limited occasions, such as upon entry into an area, as may occur for example when an individual uses an access card to enter a room.

In one example, the one or more processing devices are configured to use object movements to determine predicted object movements. This can be performed, for example, by extrapolating historical movement patterns forward in time, assuming for example that a object moving in a straight line will continue to move in a straight line for at least a short time period. It will be appreciated that a variety of techniques can be used to perform such predictions, such as using machine learning techniques to analyse patterns of movement for specific objects, or similar types of objects, combining this with other available information, such as defined intended travel paths, or the like, in order to predict future object movement. The predicted object movements can then be compared to situational awareness rules in order to identify potential situational awareness events in advance. This could be utilised, for example, to ascertain if an AGV and person are expected to intercept at some point in the future, thereby allowing an alert or warning to be generated prior to any interception occurring.

In one example, the one or more processing devices are configured to generate an environment model indicative of the environment, a location of imaging devices in the environment, locations of client devices, such as alerting beacons, current object locations, object movements, predicted object locations, predicted object movements, or the like. The environment model can be used to maintain a record of recent historical movements, which in turn can be used to assist in tracking objects that are temporarily stationary, and also to more accurately identify situational awareness events.

The environment model may be retained in memory and could be accessed by the processing device and/or other processing devices, such as remote computer systems, as required. In another example, the processing devices can be configured to generate a graphical representation of the environment model, either as it currently stands, or at historical points in time. This can be used to allow operators or users to view a current or historical environment status and thereby ascertain issues associated with situational awareness events, such as reviewing a set of circumstances leading to an event occurring, or the like. This could include displaying heat maps, showing the movement of objects within the environment, which can in turn be used to highlight bottle necks, or other issues that might give rise to situational awareness events.

As previously mentioned, in response to identifying situational awareness events, actions can be taken. This can include, but is not limited to, recording an indication of the situational awareness event, generating a notification indicative of the situational awareness event, causing an output device to generate an output indicative of the situational awareness event, including generating an audible and/or visual output, activating an alarm, or causing operation of an object to be controlled. Thus, notifications could be provided to overseeing supervisors or operators, alerts could be generated within the environment, for example to notify humans of a potential situational awareness event, such as a likelihood of imminent collision, or could be used to control autonomous or semi-autonomous vehicles, such as AGVs, allowing the vehicle control system to stop the vehicle and/or change operation of the vehicle in some other manner, thereby allowing an accident or other event to be avoided.

The imaging devices can be selected from any one or more of security imaging devices, monoscopic imaging devices, non-computer vision based imaging devices or imaging devices that do not have intrinsic calibration information. Furthermore, as the approach does not rely on the configuration of the imaging device, handling different imaging devices through the use of calibration data, this allows different types and/or models of imaging device to be used within a single system, thereby providing greater flexibility to the equipment that can be used to implement the situational awareness monitoring system.

Figure 3:
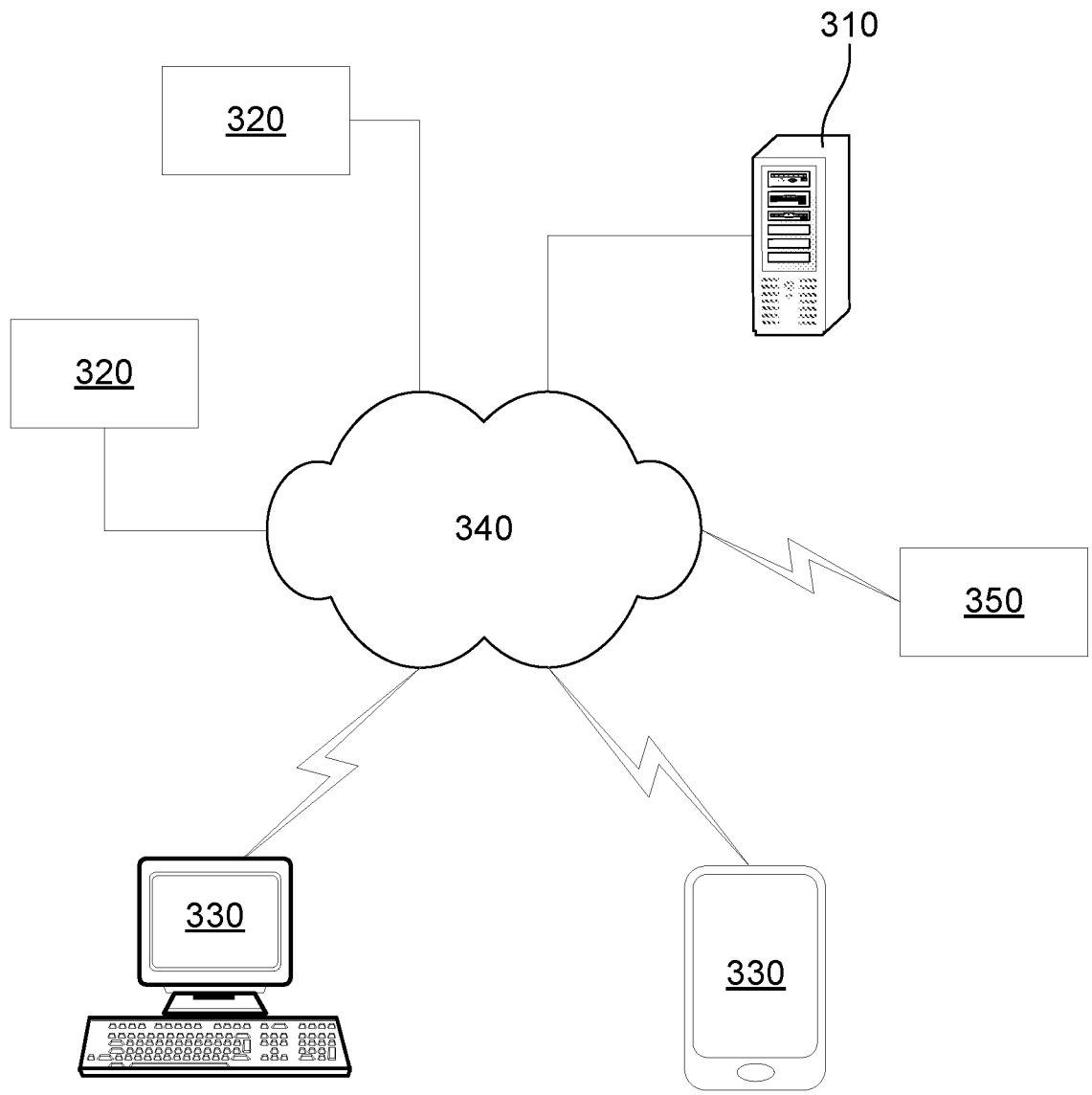
FIG. 3 is a schematic diagram of an example of a distributed computer system.

As mentioned above, in one example, the process is performed by one or more processing systems and client devices operating as part of a distributed architecture, an example of which will now be described with reference to FIG. 3.

In this example, a number of processing systems 310 are coupled via communications networks 340, such as the Internet, and/or one or more local area networks (LANs), to a number of client devices 330 and imaging devices 320. It will be appreciated that the configuration of the networks 340 are for the purpose of example only, and in practice the processing systems 310, imaging devices 320 and client devices 330 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, the processing systems 310 are configured to receiving image streams from the imaging devices, analyse the image streams and identify situational awareness events. The processing systems 310 can also be configured to implement actions, such as generating notifications and/or alerts, optionally displayed via client devices or other hardware, control operations of AGVs, or similar, or create and provide access to an environment model. Whilst the processing system 310 is a shown as a single entity, it will be appreciated that the processing system 310 can be distributed over a number of geographically separate locations, for example by using processing systems 310 and/or databases that are provided as part of a cloud based environment. However, the above described arrangement is not essential and other suitable configurations could be used.

Figure 4:
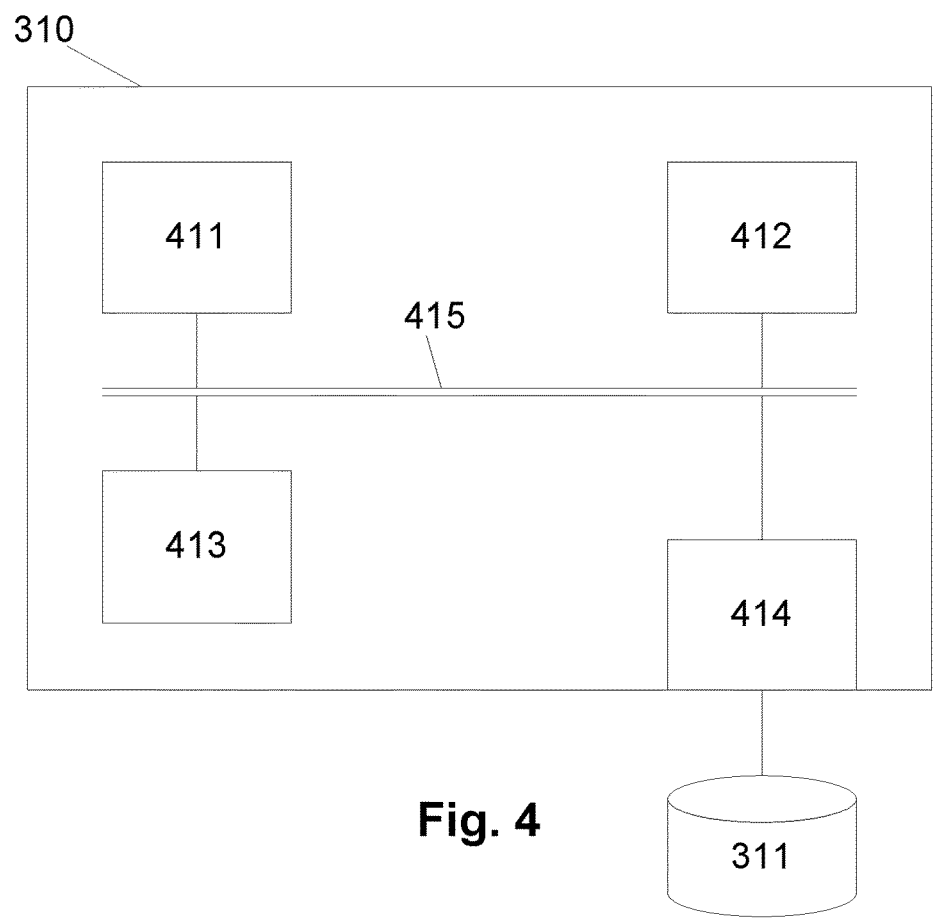
FIG. 4 is a schematic diagram of an example of a processing system.

An example of a suitable processing system 310 is shown in FIG. 4.

In this example, the processing system 310 includes at least one microprocessor 411, a memory 412, an optional input/output device 413, such as a keyboard and/or display, and an external interface 414, interconnected via a bus 415, as shown. In this example the external interface 414 can be utilised for connecting the processing system 310 to peripheral devices, such as the communications network 340, databases, other storage devices, or the like. Although a single external interface 414 is shown, this is for the purpose of example only, and in practice multiple interfaces using various methods (eg. Ethernet, serial, USB, wireless or the like) may be provided.

In use, the microprocessor 411 executes instructions in the form of applications software stored in the memory 412 to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed client device, PC, web server, network server, or the like. In one particular example, the processing system 310 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 5:
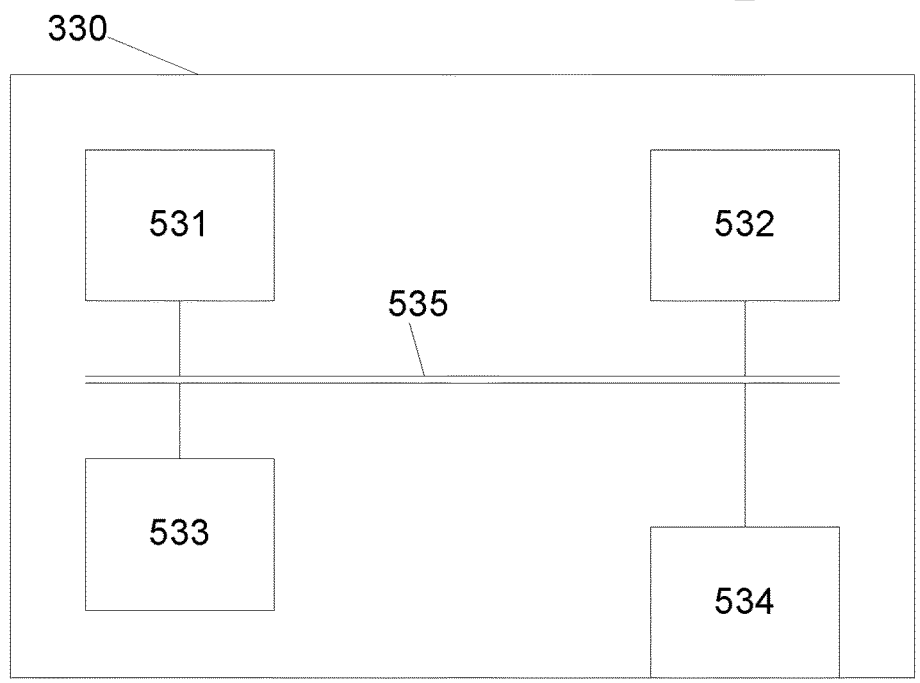
FIG. 5 is a schematic diagram of an example of a client device.

An example of a suitable client device 330 is shown in FIG. 5.

In one example, the client device 330 includes at least one microprocessor 531, a memory 532, an input/output device 533, such as a keyboard and/or display, and an external interface 534, interconnected via a bus 535, as shown. In this example the external interface 534 can be utilised for connecting the client device 330 to peripheral devices, such as the communications networks 340, databases, other storage devices, or the like. Although a single external interface 534 is shown, this is for the purpose of example only, and in practice multiple interfaces using various methods (eg. Ethernet, serial, USB, wireless or the like) may be provided.

In use, the microprocessor 531 executes instructions in the form of applications software stored in the memory 532 to allow communication with the processing system 310, for example to allow notifications or the like to be received and/or to provide access to an environment model.

Accordingly, it will be appreciated that the client devices 330 may be formed from any suitable processing system, such as a suitably programmed PC, Internet terminal, laptop, or hand-held PC, and in one preferred example is either a tablet, or smart phone, or the like. Thus, in one example, the client device 330 is a standard processing system such as an Intel Architecture based processing system, which executes software applications stored on non-volatile (e.g., hard disk) storage, although this is not essential. However, it will also be understood that the client devices 330 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for performing situational awareness monitoring will now be described in further detail. For the purpose of these examples it is assumed that one or more processing systems 310 act to monitor image streams from the image devices 320, analyse the image streams to identify situational awareness events, and then perform required actions as needed. User interaction can be performed based on user inputs provided via the client devices 330, with resulting notification of model visualisations being displayed by the client devices 330. In one example, to provide this in a platform agnostic manner, allowing this to be easily accessed using client devices 330 using different operating systems, and having different processing capabilities, input data and commands are received from the client devices 330 via a webpage, with resulting visualisations being rendered locally by a browser application, or other similar application executed by the client device 330.

The processing system 310 is therefore typically a server (and will hereinafter be referred to as a server) which communicates with the client device 330 via a communications network 340, or the like, depending on the particular network infrastructure available.

To achieve this the server 310 typically executes applications software for analysing images, as well as performing other required tasks including storing and processing of data, with actions performed by the processing system 310 being performed by the processor 411 in accordance with instructions stored as applications software in the memory 412 and/or input commands received from a user via the I/O device 413, or commands received from the client device 330. It will also be assumed that the user interacts with the server 310 via a GUI (Graphical User Interface), or the like presented on the server 310 directly or on the client device 330, and in one particular example via a browser application that displays webpages hosted by the server 310, or an App that displays data supplied by the server 310. Actions performed by the client device 330 are performed by the processor 531 in accordance with instructions stored as applications software in the memory 532 and/or input commands received from a user via the I/O device 533.

However, it will be appreciated that the above described configuration assumed for the purpose of the following examples is not essential, and numerous other configurations may be used. It will also be appreciated that the partitioning of functionality between the client devices 330, and the server 310 may vary, depending on the particular implementation.

Figure 6:
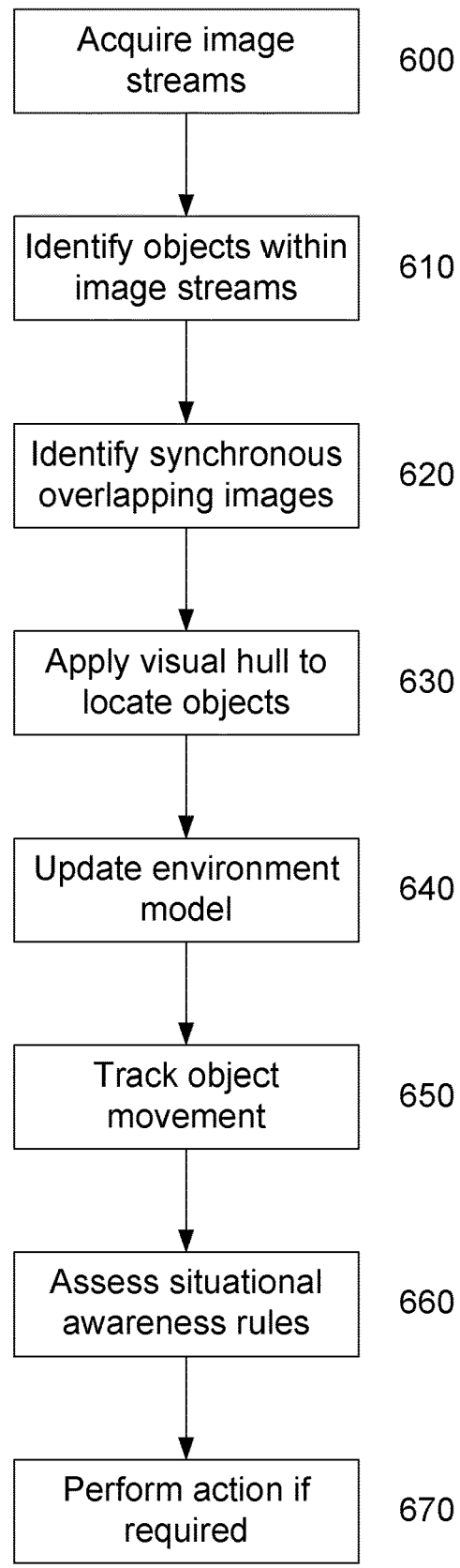
FIG. 6 is a flowchart of a further example of a method for situational awareness monitoring within an environment.

An example of a process for monitoring situational awareness will now be described with reference to FIG. 6.

In this example, at step 600, the server 310 acquires multiple image streams from the imaging devices 320. At step 610 the server 310 operates to identify objects within the image streams, typically by analysing each image stream to identify movements within the image stream. Having identified objects, at step 620, the server 310 operates to identify synchronous overlapping images, using information regarding the relative position of the different imaging devices.

At step 630 the server 310 employs a visual hull analysis to locate objects in the environment, using this information to update an environment model at step 640. In this regard, the environment model, is a model of the environment including information regarding the current and optionally historical location of objects within the environment. This can then be used to track object movements and/or locations at step 650.

Once the object movements and/or location of static objects are known, the movements or locations are compared to situational awareness rules at step 660, allowing situational awareness events, such as breaches of the rules, to be identified. This information is used in order to perform any required actions, such as generation of alerts or notifications, controlling of AGVs, or the like, at step 670.

Figure 7:
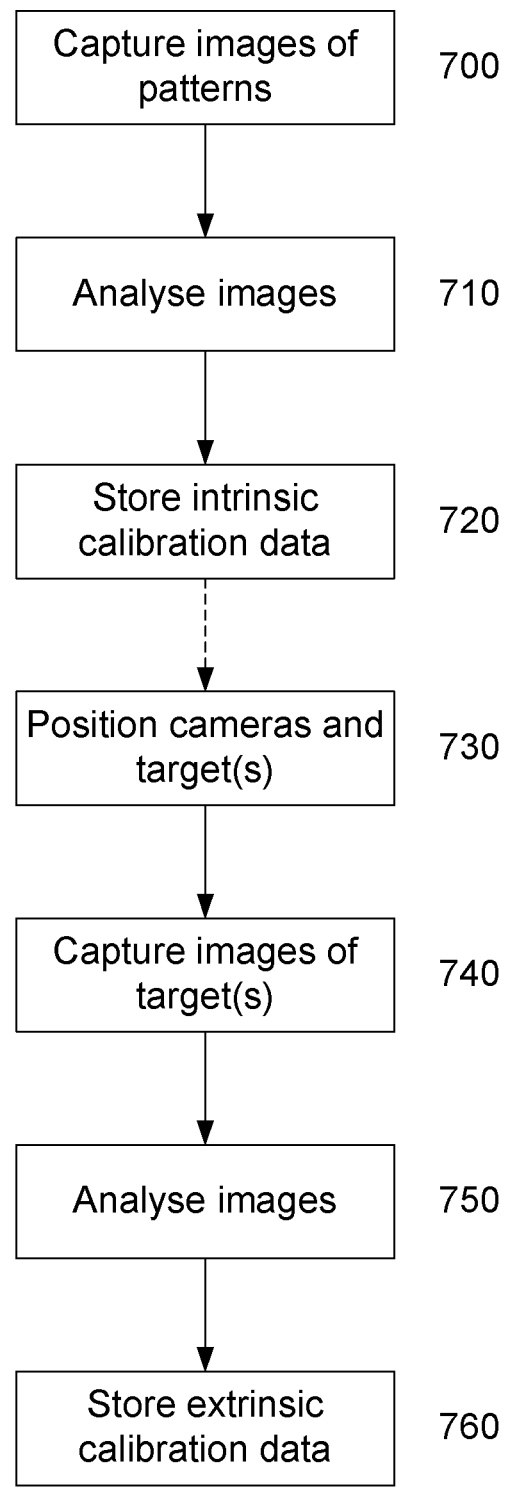
FIG. 7 is a flowchart of an example of a calibration method for use with a system for situational awareness monitoring within an environment.

As mentioned above, the above described approach typically relies on a calibration process, which involves calibrating the imaging devices 320 both intrinsically, in order to determine imaging device properties, and extrinsically, in order to take into account positions of the imaging devices within the environment. An example of such a calibration process will now be described with reference to FIG. 7.

In this example, at step 700 the imaging devices are used to capture images of patterns. The patterns are typically of a predetermined known form and could include patterns of dots, machine readable coded data, such as April Tags, or the like. The images of the patterns are typically captured from a range of different angles.

At step 710 the images are analysed by comparing the captured images to reference images representing the intended appearance of the known patterns, allowing results of the comparison to be used to determine any distortions or other visual effects arising from the characteristics of the particular imaging device. This is used to derive intrinsic calibration data for the imaging device at step 720, which is then stored as part of calibration data, allowing this to be used to correct images captured by the respective imaging device, so as to generate a corrected image.

It will be appreciated that steps 700 to 720 are repeated for each individual imaging device to be used, and can be performed in situ, or prior to placement of the imaging devices.

At step 730, assuming this has not already been performed, the cameras and one or more targets are positioned in the environment. The targets can be of any appropriate form and could include dots, fiducial markings such as April Tags, or the like.

At step 740 images of the targets are captured by the imaging devices 320, with the images being provided to the server 310 for analysis at step 750. The analysis is performed in order to identify targets that have been captured by the different imaging devices 320 from different angles, thereby allowing the relative position of the imaging devices 320 to be determined. This process can be performed manually, for example by having the user highlight common targets in different images, allowing triangulation to be used to calculate the location of the imaging devices that captured the images. Alternatively, this can be performed at least in part using image processing techniques, such as by recognising different targets positioned throughout the environment, and then again using triangulation to derive the camera positions. This process can also be assisted by having the user identify an approximate location of the cameras, for example by designating these within an environment model.

At step 760 extrinsic calibration data indicative of the relative positioning of the imaging devices is stored as part of the calibration data.

Figure 8A:
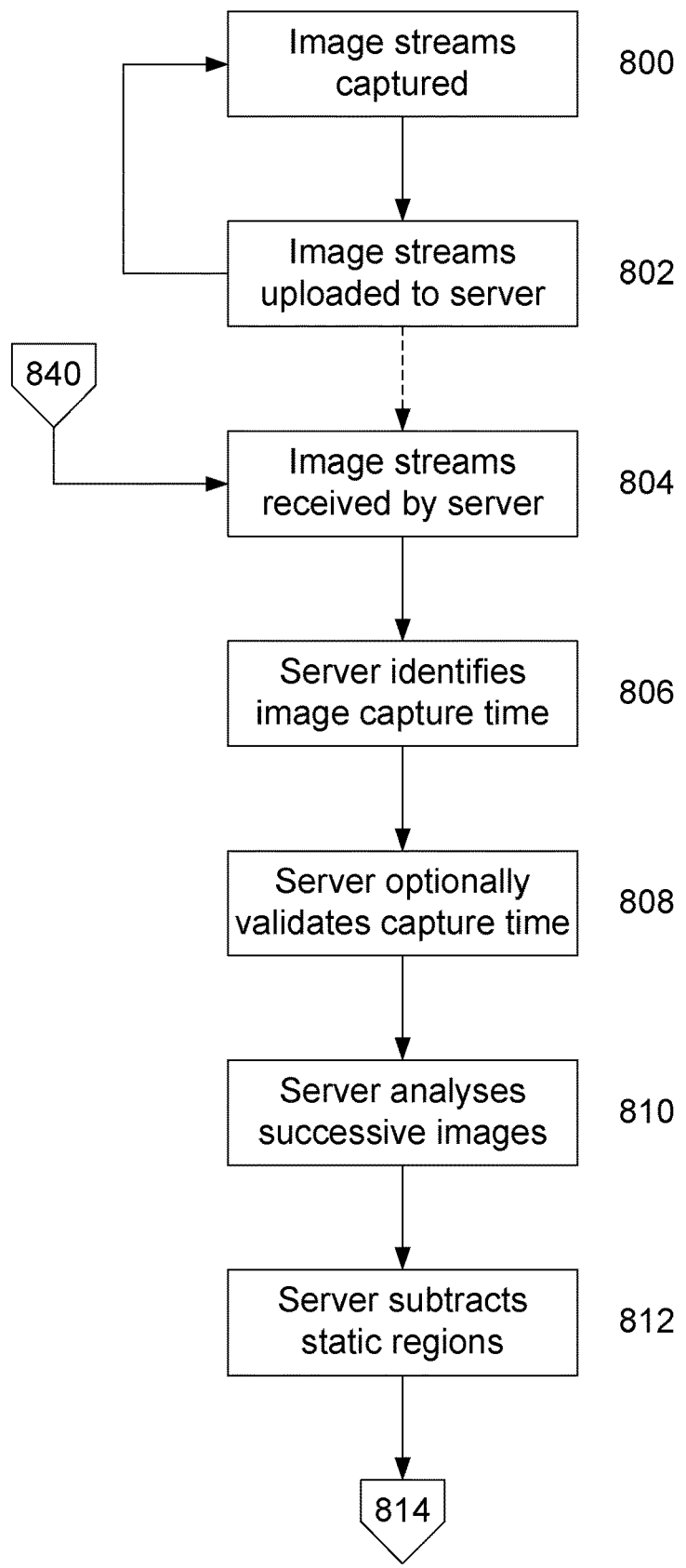
FIGS. 8A to 8C are a flowchart of a specific example of a method for situational awareness monitoring within an environment.
Figure 8B:
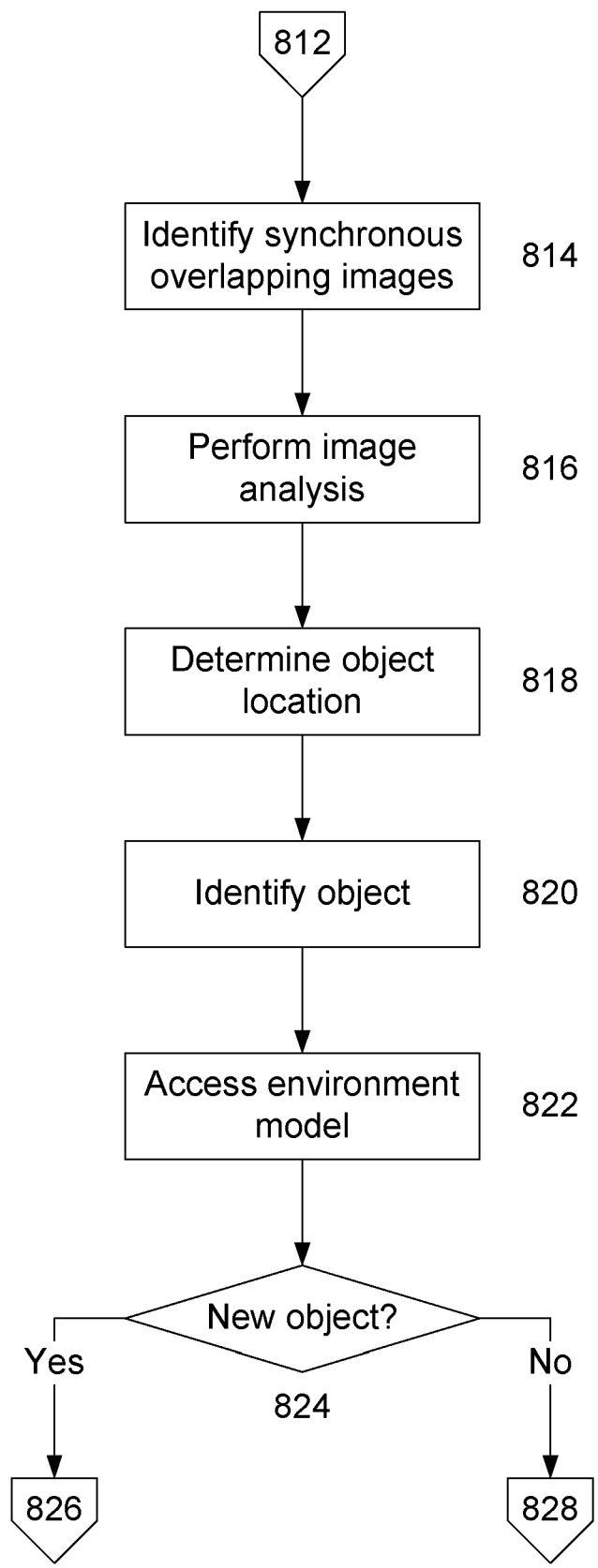
Figure 8C:
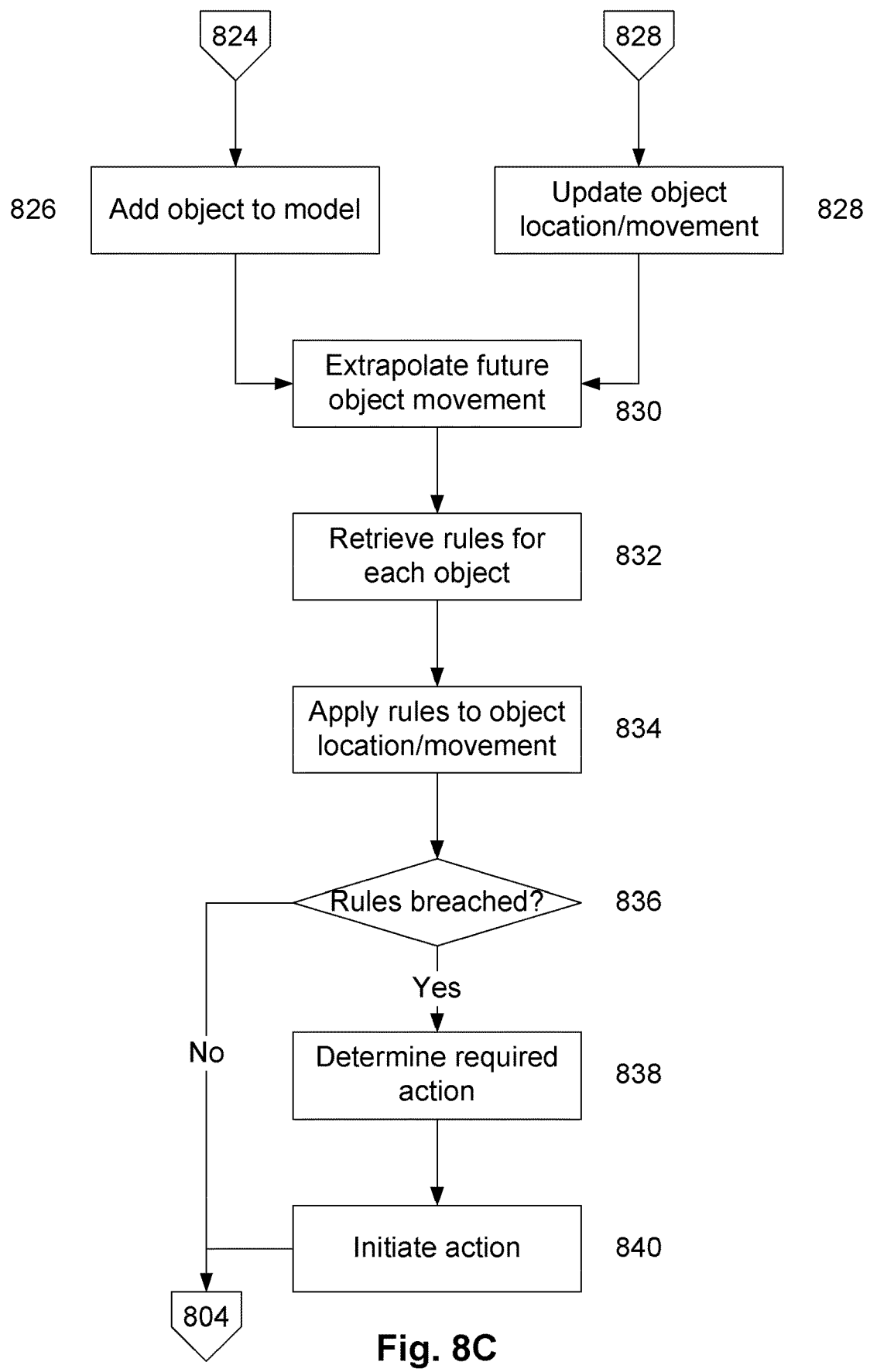

An example of a process for performing situational monitoring will now be described in more detail with reference to FIGS. 8A to 8C.

In this example, at step 800 image streams are captured by the imaging devices 310 with these being uploaded to the server 310 at step 802. Steps 800 and 802 are repeated substantially continuously so that image streams are presented to the server 310 substantially in real time.

At step 804 image streams are received by the server 310, with the server operating to identify an image capture time at step 806 for each image in the image stream, typically based on a time stamp associated with each image and provided by the respective imaging device 320. This time is then optionally validated at step 808, for example by having the server 310 compare the time stamped capture time to a time of receipt of the images by the server 310, taking into account an expected transmission delay, to ensure that the times are within a predetermined error margin. In the event that the time is not validated, an error can be generated allowing the issue to be investigated.

Otherwise, at step 810 the server 310 analyses successive images and operates to subtract static regions from the images at step 812. This is used to identify moving components within each image, which are deemed to correspond to objects moving within the environment.

At step 814, synchronous overlapping images are identified by identifying images from different image streams that were captured substantially simultaneously, and which include objects captured from different viewpoints. Identification of overlapping images can be performed using the extrinsic calibration data, allowing cameras with overlapping field of view to be identified, and can also involve analysis of images including objects to identify the same object in the different images. This can examine the presence of machine readable coded data, such as April Tags within the image, or can use recognition techniques to identify characteristics of the objects, such as object colours, size, shape, or the like.

At step 816, the images are analysed to identify object locations at step 818. This can be performed using coded fiducial markings, or by performing a visual hull analysis, in the event that such markings are not available. It will be appreciated that in order to perform the analysis this must take into account the extrinsic and intrinsic calibration data to correct the images for properties of the imaging device, such as any image distortion, then further utilising knowledge of the relative position of the respective imaging devices in order to interpret the object location and/or a rough shape in the case of performing a visual hull analysis.

Figure 9:
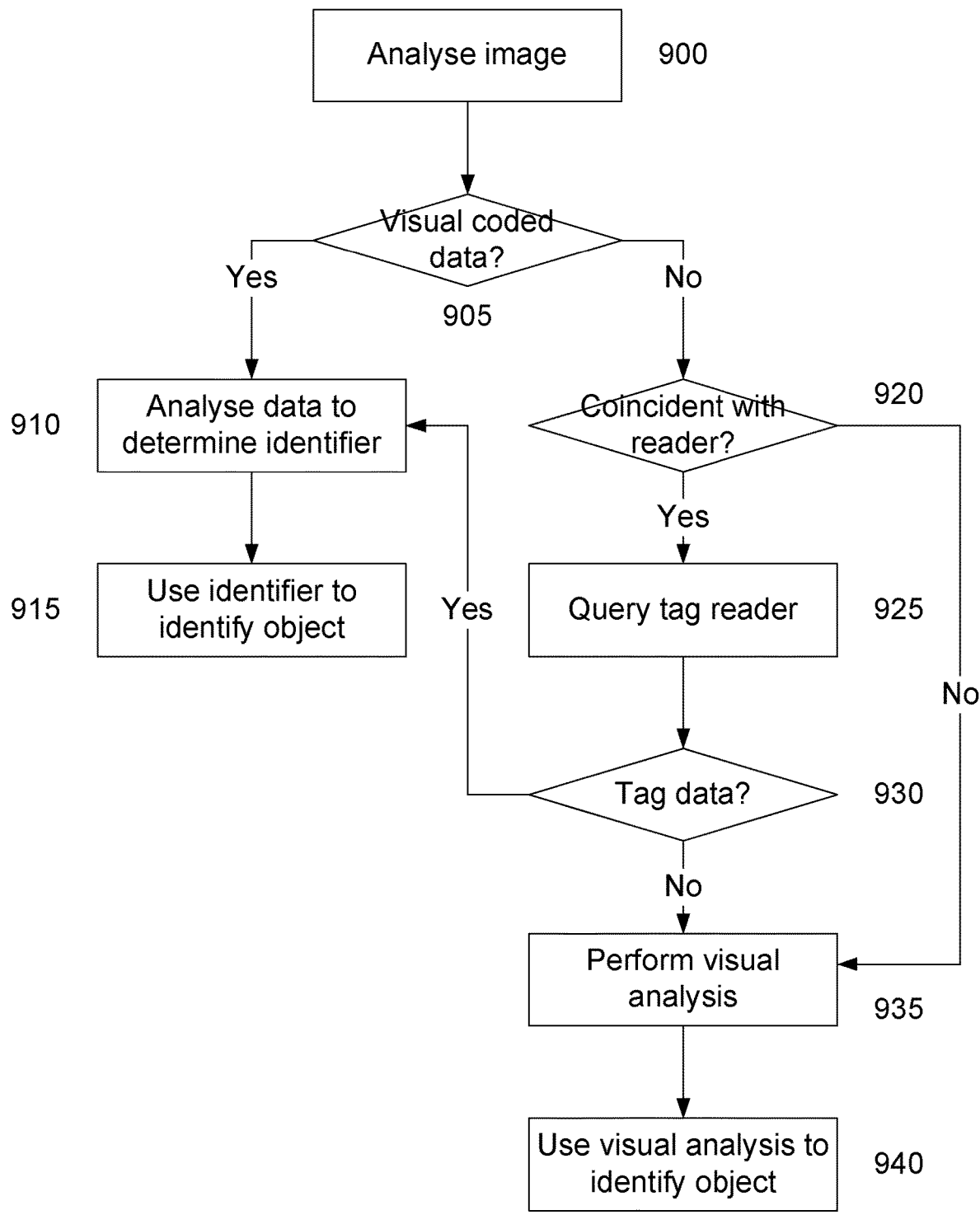
FIG. 9 is a flowchart of an example of a method of identifying objects as part of a situational awareness monitoring method; and, FIG. 10 is a schematic diagram of an example of a graphical representation of a situational awareness model.

Having determined an object location, at step 820 the server 310 operates to determine an object identity. In this regard the manner in which an object is identified will vary depending on the nature of the object, and any identifying data, and an example identification process will now be described in more detail with reference to FIG. 9.

In this example, at step 900, the server 310 analyses one or more images of the object, using image processing techniques, and ascertains whether the image includes visual coded data, such as an April Tag at step 905. If the server identifies an April Tag or other visual coded data, this is analysed to determine an identifier associated with the object at step 910. An association between the identifier and the object is typically stored as object data in a database when the coded data is initially allocated to the object, for example during a set-up process when an April tag is attached to the object. Accordingly, decoding the identifier from the machine readable coded data allows the identity of the object to be retrieved from the stored object data, thereby allowing the object to be identified at step 915.

In the event that visual coded data is not present, the server 310 determines if the object is coincident with a reader, such as a Bluetooth or RFID tag reader at step 920. If so, the tag reader is queried at step 925 to ascertain whether tagged data has been detected from a tag associated with the object. If so, the tag data can be analysed at step 910 to determine an identifier, with this being used to identify the object at step 915, using stored object data in a manner similar to that described above.

In the event that tag data is not detected, or the object is not coincident with the reader, a visual analysis can be performed using image recognition techniques at step 935 in order to attempt to identify the object at step 940. It will be appreciated that this may only be sufficient to identify a type of object, such as a person, and might not allow discrimination between objects of the same type. Additionally, in some situations, this might not allow for identification of objects, in which case the objects can be assigned an unknown identity.

At step 822 the server 310 accesses an existing environment model and assesses whether a detected object is a new object at step 824. For example, if a new identifier is detected this will be indicative of a new object. Alternatively, for objects with no identifier, the server 310 can assess if the object is proximate to an existing object within the model, meaning the object is an existing object that has moved. It will be noted in this regard, that as objects are identified based on movement between images, an object that remains static for a prolonged period of time may not be detected within the images, depending on how the detection is performed as previously described. However, a static object will remain present in the environment model based on its last known location, so that when the object recommences movement, and is located within the images, this can be matched to the static object within the environment model, based on the coincident location of the objects, although it will be appreciated that this may not be required depending on how objects are detected.

If it is determined that the object is a new object, the object is added to the environment model at step 826. In the event that the object is not a new object, for example if it represents a moved existing object, the object location and/or movement can be updated at step 828.

In either case, at step 830, any object movement can be extrapolated in order to predict future object movement. Thus, this will examine a trend in historical movement patterns and use this to predict a likely future movement over a short period of time, allowing the server 310 to predict where objects will be a short time in advance. As previously described, this can be performed using machine learning techniques or similar, taking into account previous movements for the object, or objects of a similar type, as well as other information, such as defined intended travel paths.

At step 832, the server 310 retrieves rules associated with each object in the environment model using the respective object identity. The rules will typically specify a variety of situational awareness events that might arise for the respective object, and can include details of permitted and/or denied movements. These could be absolute, for example, comparing an AGV's movement to a pre-programmed travel path, to ascertain if the object is moving too far from the travel path, or comparing an individual's movement to confirm they are within permitted zones, or outside denied zones. The situational awareness rules could also define relative criteria, such as whether two objects are within less than a certain distance of each other, or are on intersecting predicted travel paths.

As previously described, the rules are typically defined based on an understanding of requirements of the particular environment and the objects within the environment. The rules are typically defined for specific objects, object types or for multiple objects, so that different rules can be used to assess situational awareness for different objects. The situational awareness rules are typically stored together with associated object identities, either in the form of specific object identifiers, or specified object types, as rule data, allowing the respective rules to be retrieved for each detected object within the environment.

At step 834 the rules are applied to the object location, movement or predicted movement associated with each object, to determine if the rules have been breached at step 836, and hence that an event is occurring.

If it is assessed that the rules are breached at step 836, the server 310 determines any action required at step 838, by retrieving the action from the rules data, allowing the action to be initiated at step 840. In this regard, the relevant action will typically be specified as part of the rules, allowing different actions to be defined associated with different objects and different situational awareness events. This allows a variety of actions to be defined, as appropriate to the particular event, and this could include, but is not limited to, recording an event, generating alerts or notifications, or controlling autonomous or semi-autonomous vehicles.

In one example, client devices 330, such as mobile phones, can be used for displaying alerts, so that alerts could be broadcast to relevant individuals in the environment. This could include broadcast notifications pushed to any available client device 330, or could include directing notifications to specific client devices 330 associated with particular users. For example, if an event occurs involving a vehicle, a notification could be provided to the vehicle operator and/or a supervisor. In a further example, client devices 330 can include displays or other output devices, such as beacons configured to generate audible and/or visual alerts, which can be provided at specific defined locations in the environment, or associated with objects, such as AGVs. In this instance, if a collision with an AGV or other object is imminent, a beacon on the object can be activated alerting individuals to the potential collision, and thereby allowing the collision to be avoided.

In a further example, the client device 330 can form part of, or be coupled to, a control system of an object such as an autonomous or semi-autonomous vehicle, allowing the server 310 to instruct the client device 330 to control the object, for example causing movement of the object to cease until the situational awareness event is mitigated.

It will be appreciated from the above that client devices 330 can be associated with respective objects, or could be positioned within the environment, and that this will be defined as part of a set-up process. For example, client devices 330 associated with objects could be identified in the object data, so that when an action is be performed associated with a respective object, the object data can be used to retrieve details of the associated client device and thereby push notifications to the respective client device. Similarly, details of static client devices could be stored as part of the environment model, with details being retrieved in a similar manner as needed.

In any event, once the action has been initiated or otherwise, the process can return to step 804 to allow monitoring to continue.

Figure 10:
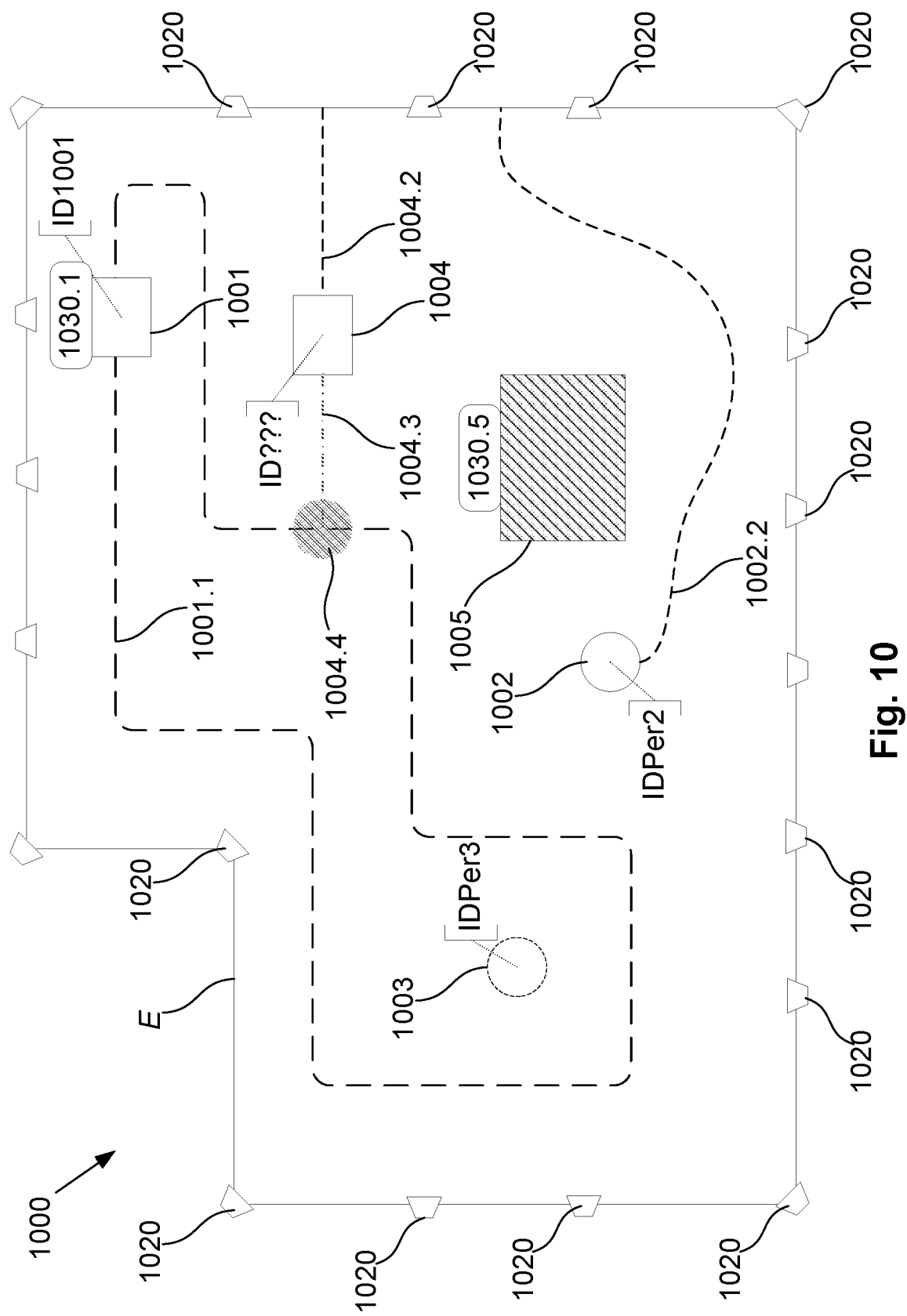

In addition to performing situational awareness monitoring, and performing actions as described above, the server 310 also maintains the environment model and allows this to be viewed by way of a graphical representation. This can be achieved via a client device 330, for example, allowing a supervisor or other individual to maintain an overview of activities within the environment, and also potentially view situational awareness events as they arise. An example of a graphical representation of an environment model will now be described in more detail with reference to FIG. 10.

In this example the graphical representation 1000 includes an environment E, such as an internal plan of a building or similar. It will be appreciated that the graphical representation of the building can be derived based on building plans and/or by scanning or imaging the environment. The model includes icons 1020 representing the location of imaging devices 320, icons 1001, 1002, 1003 and 1004 representing the locations of objects, and icons 1030 representing the location of client devices 330, such as beacons used in generating audible and/or visual alerts.

The positioning of imaging devices 320 can be performed as part of the calibration process described above, and may involve having a user manually position icons at approximate locations, with the positioning being refined as calibration is performed. Similarly, positioning of the client devices could also be performed manually, in the case of static client devices 320, and/or by associating a client device 320 with an object, so that the client device location is added to the model when the object is detected within the environment.

In this example, the representation also displays additional details associated with objects. In this case, the object 1001 is rectangular in shape, which could be used to denote an object type, such as an AGV, with the icon having a size similar to the footprint of the actual physical AGV. The object 1001 has an associated identifier ID1001 shown, which corresponds to the detected identity of the object. In this instance, the object has an associated pre-programmed travel path 1001.1, which is the path the AGV is expected to follow, whilst a client device icon 1030.1 is shown associated with the object 1001, indicating that a client device is provided on the AGV.

In this example, the object 1002 is a person, and hence denoted with a different shape to the object 1001, such as a circle, again having a footprint similar to that of the person. The object has an associated object identifier IDPer2, indicating this is a person, and using a number to distinguish between different people. The object 1002 has a travel path 1002.2, representing historical movement of the object 1002 within the environment.

Object 1003 is again a person, and includes an object identifier IDPer3, to distinguish from the object 1002. In this instance the object is static and is as a result shown in dotted lines.

Object 1004 is a second AGV, in this instance having an unknown identifier represented by ID???. The AGV 1004 has a historical travel path 1004.2 and a predicted travel path 1004.3. In this instance it is noted that the predicted travel path intersects with the predetermined path 1001.1 of the AGV 1001 and it is anticipated that an intersection may occur in the region 1004.4, which is highlighted as being a potential issue.

Finally a denied region 1005 is defined, into which no objects are permitted to enter, with an associated client device 330 being provided as denoted by the icon 1030.5, allowing alerts to be generated if objects approach the denied region.

Figure 11:
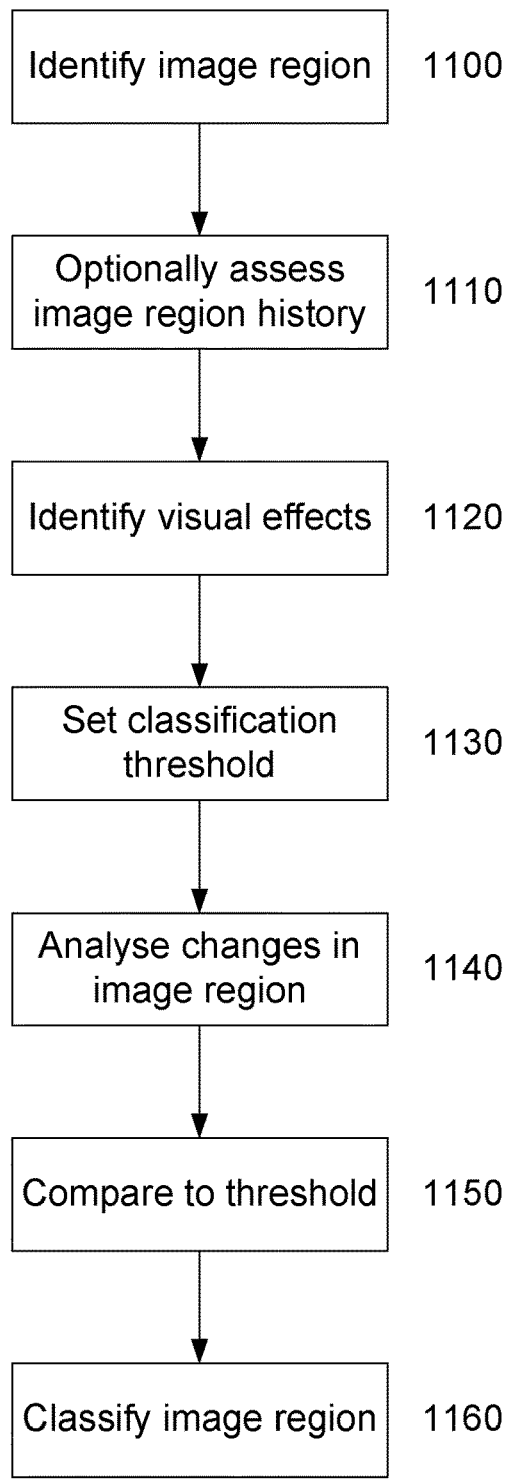
FIG. 11 is a flow chart of an example of a process for image region classification.

As described above, image regions are classified in order to assess whether the image region is of a static part of the environment, or part of the environment including movement, which can in turn be used to identify objects. An example of a process for classifying image regions will now be described in more detail with reference to FIG. 11.

At step 1100, an image region is identified. The image region can be arbitrarily defined, for example by segmenting each image based on a segmentation grid, or similar, or may be based on the detection of movement in the previous images. Once an image region is identified, the server optionally assesses a history of the image region at step 1110, which can be performed in order to identify if the image region has recently been assessed as non-static, which is in turn useful in identifying objects that have recently stopped moving.

At step 1120, visual effects can be identified. Visual effects can be identified in any appropriate manner depending on the nature of the visual effect and the preferred implementation. For example, this may involve analysing signals from illumination sensors to identify changes in background or ambient illumination. Alternatively this could involve retrieving information regarding visual effect locations within the environment, which could be defined during a calibration process, for example by specifying the location of screens or displays in the environment. This can also involve analysing the images in order to identify visual effects, for example to identify parts of the image including a spectral response known to correspond to a visual effect, such as a particular illumination source. This process is performed to account for visual effects and ensure these are not incorrectly identified as moving objects.

At step 1130, a classification threshold is set, which is used to assess whether an image region is static or non-static. The classification threshold can be a default value, which is then modified as required based on the image region history and/or identified visual effects. For example, if the individual region history indicates that the image region was previously or recently classified as non-static, the classification threshold can be raised from a default level to reduce the likelihood of the image region are being classified as static in the event that an object has recently stopped moving. This in effect increases the learning duration for assessing changes in the respective image region, which is useful in tracking temporarily stationary objects. Similarly, if visual effects are present within the region, the threat classification threshold can be modified to reduce the likelihood of the image region are being misclassified.

Once the classification threshold has been determined, changes in that the image region are analysed at step 1140. This is typically performed by comparing the same image region across multiple images of the image stream. The multiple images can be successive images but this is not essential and any images which are temporally spaced can be assessed. Following this, at step 1150 the changes in the image region are compared to a threshold, with results of the comparison being used to classify the image region at step 1160, for example a defining the region to be a static if the degree of movement falls below the classification threshold.

Figure 12:
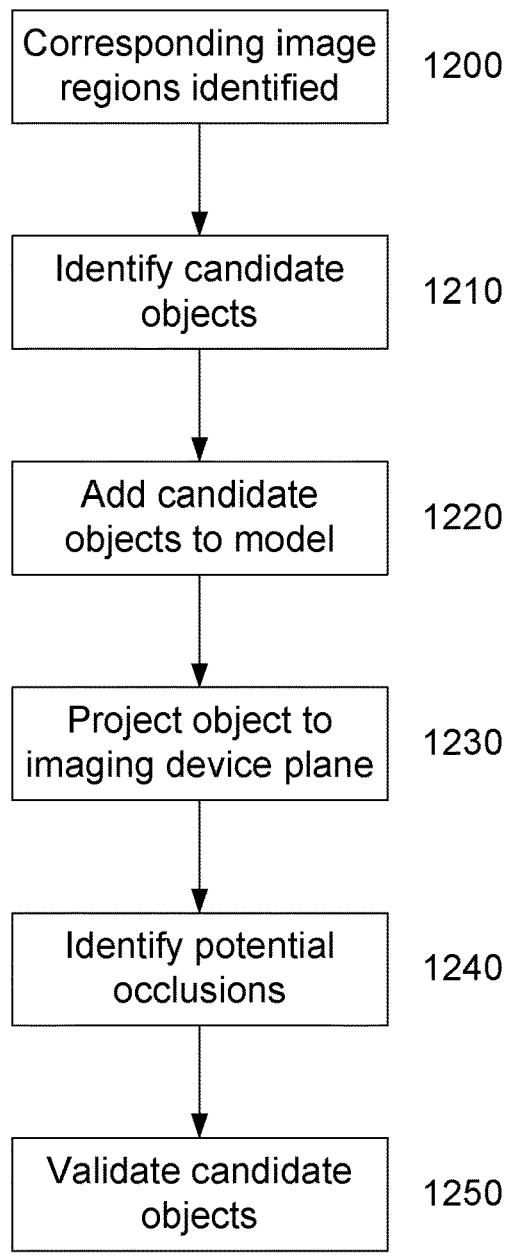
FIG. 12 is a flow chart of an example of a process for occlusion mitigation; and, FIG. 13 is a flow chart of an example of a process for weighted object detection.

As previously described, occlusions may arise in which objects are at least partially obstructed from an imaging device, and an example of a process for occlusion detection and mitigation will now be described with reference to FIG. 12.

In this example, corresponding image regions are identified in multiple overlapping images at step 1200. In this regard, the corresponding image regions are image regions from multiple overlapping images that are a view of a common volume in the environment, such as one or more voxels. At step 1210 one or more candidate objects are identified, for example using a visual hull technique.

At step 1220, any candidate objects are added to a three-dimensional model, such as a model similar to that described above with respect to FIG. 10. At step 1230, the candidate objects are back projected onto the imaging plane of an imaging device that captured an image of the candidate objects. This is performed in order to ascertain whether the candidate objects are overlapping and hence an occlusion may have occurred.

Once potential occlusions have been identified, at step 1240 the server can use this information to validate candidate objects. For example, for candidate objects not subject to occlusion, these can be accepted to detected objects. Conversely, where occlusions are detected, the visual hull process can be repeated taking the occlusion into account. This could be achieved by removing the image region containing the occlusion from the visual hull process, or more typically taking the presence of the occlusion into account, for example using a weighting process or similar as will be described in a more detail below.

Figure 13:
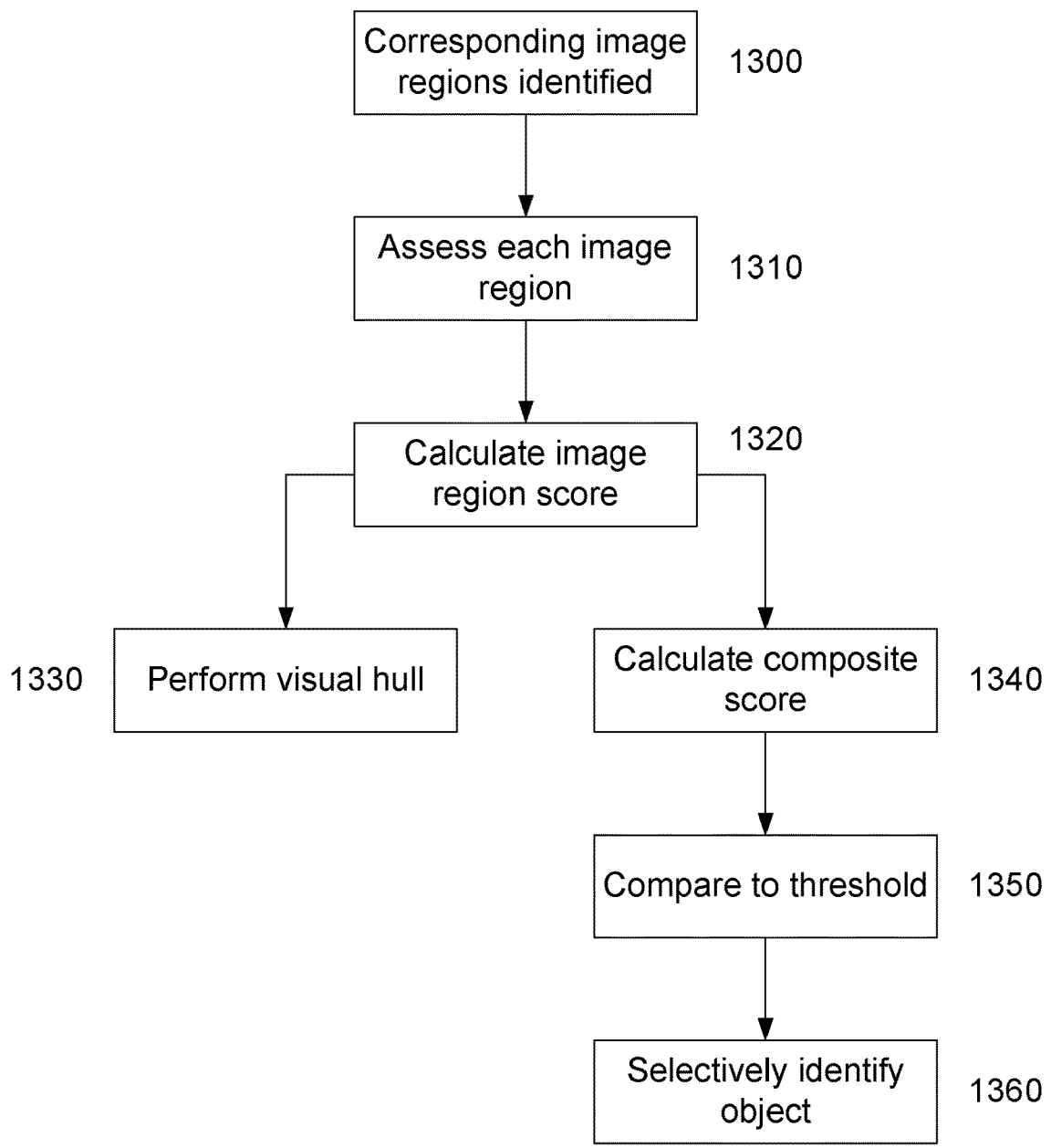

An example of weighting process for object identification will now be described with reference to FIG. 13.

In this example, at step 1300 corresponding image regions are identified in a manner similar to that described with respect to step 1200.

At step 1310, each image region is assessed, with the assessment being used to ascertain the likelihood that the detection of an object is accurate. In this regard, it will be appreciated that successful detection of an object will be influenced by a range of factors, including image quality such as image resolution or distortion, camera geometry such as a camera distance and angle, image region history such as whether the image region was previous static or non-static, the presence or absence of occlusions or visual effects, a degree of asynchronicity between collected data, such as difference in capture time of the overlapping images, or the like.

Accordingly, this process attempts to take these factors into account by assigning a value based on each factor, and using this to determine an image region score at step 1320. For example, the value for each factor will typically represent whether the factor will positively or negatively influence successful detection of an object so if an occlusion is at present a value of −1 could be used, whereas if an occlusion is not present a value of +1 could be used, indicating that it is more likely an object detection would be correct than if an occlusion is present.

Once calculated, the image region scores can then be used in the identification of objects.

In one example, at step 1330 the visual hull process is performed, using the image region score as a weighting. Thus, in this instance, an image region with a low image region score, which is less likely to have accurately imaged the object, will be given a low weighting in the visual hull process. Consequently, this will have less influence on the object detection process, so the process is more heavily biased to image regions having a higher image region source. Additionally and/or alternatively, a composite object score can be calculated by combining the image region score of each of the corresponding image regions at step 1340, with the resulting value being compared to a threshold at step 1350, with this being used to assess whether an object has been successfully identified at step 1360.

Accordingly, it will be appreciated that the above described system operates to track movement of objects within the environment which can be achieved using low cost sensors. Movement and/or locations of the objects can be compared to defined situational awareness rules to identify rule breaches which in turn can allow actions to be taken such as notifying of the breach and/or controlling AGVs in order to prevent accidents or other compliance event occurring.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A system for situational awareness monitoring within an environment, wherein the system includes one or more processing devices configured to:
   a) receive an image stream including a plurality of captured images from each of a plurality of imaging devices, the plurality of imaging devices being configured to capture images of objects within the environment and at least some of the imaging devices being positioned within the environment at different known locations and having at least partially overlapping fields of view;
   b) identify overlapping images in the different image streams, the overlapping images being images captured by imaging devices having overlapping fields of view;
   c) analyse the overlapping images using the different known locations of the plurality of imaging devices to determine object locations within the environment;
   d) determine an object identity for at least one object, wherein:
      i) the object identity is at least one of:
         (1) indicative of an object type; and,
         (2) uniquely indicative of the object and,
      ii) the object identity is determined by at least one of:
         (1) analysing movement patterns;
         (2) using image recognition; and,
         (3) using machine readable coded data;
   e) analyse changes in the object locations over time to determine object movements within the environment;
   f) compare the object movements to situational awareness rules at least in part using the object identity by:
      i) selecting one or more situational awareness rules in accordance with the object identity; and,
      ii) comparing the object movement to the selected situational awareness rules; and,
   g) use results of the comparison to identify situational awareness events.

2. A system according to claim 1, wherein the overlapping images are synchronous overlapping images captured at approximately the same time and wherein the one or more processing devices are configured to:
   a) determine a capture time of each captured image using at least one of:
      i) a capture time generated by the imaging device;
      ii) a receipt time associated with each image, the receipt time being indicative of a time of receipt by the one or more processing devices; and,
      iii) a comparison of image content in the images; and,
   b) identify synchronous images using the captured time.

3. A system according to claim 1, wherein the one or more processing devices are configured to:
   a) analyse images from each image stream to identify object images, the object images being images including objects; and,
   b) identify overlapping images as object images that include the same object.

4. A system according to claim 1, wherein the one or more processing devices are configured to:
   a) analyse a number of images from an image stream to identify static image regions; and,
   b) identifying object images as images including non-static image regions.

5. A system according to claim 1, wherein the one or more processing devices are configured to:
   a) determine a degree of change in appearance for an image region between images in an image stream; and,
   b) identify objects at least in part based on the degree of change by:
      i) comparing the degree of change to a classification threshold;
      ii) classifying the image region based on results of the comparison; and,
      iii) identifying objects based on classification of the image region.

6. A system according to claim 5, wherein the one or more processing devices are configured to:
   a) identify an object image region containing an object that has stopped moving; and,
   b) modify the classification threshold for the object image region so as to decrease the degree of change required in order to classify the image region as a non-static image region.

7. A system according to claim 1, wherein the one or more processing devices are configured to:
   a) identify image regions including visual effects; and,
   b) process the images in accordance with the visual effects to thereby identify objects by at least one of:
      i) excluding image regions including visual effects; and,
      ii) classifying image regions accounting for the visual effects; and,
   c) adjusting a classification threshold based on identified visual effects.

8. A system according to claim 1, wherein the one or more processing devices are configured to determine an object location using at least one of:

a) a visual hull technique; and,
b) detection of fiducial markings in the images; and,
c) detection of fiducial markings in multiple triangulated images.

9. A system according to claim 1, wherein the one or more processing devices are configured to:
   a) identify corresponding image regions in overlapping images, the corresponding images being images of a volume within the environment; and,
   b) analyse the corresponding image regions to identify objects in the volume.

10. A system according to claim 9, wherein the one or more processing devices are configured to:
    a) analyse corresponding image regions to identify candidate objects;
    b) generate a model indicative of object locations in the environment;
    c) analyse the model to identify potential occlusions; and,
    d) use the potential occlusions to validate candidate objects.

11. A system according to claim 9, wherein the one or more processing devices are configured to:
    a) calculate an object score associated with corresponding image regions, the object score being indicative of a certainty associated with detection of an object in the corresponding image regions; and,
    b) use the object score to identify objects.

12. A system according to claim 9, wherein the one or more processing devices are configured to:
    a) generate an image region score for each of the corresponding image regions using at least one of:
       i) an image region classification;
       ii) a longevity of an image region classification;
       iii) historical changes image region classification;
       iv) a presence or likelihood of visual effects;
       v) a degree of change in appearance for an image region between images in an image stream;
       vi) a camera geometry relative to the image region;
       vii) a time of image capture; and,
       viii) an image quality; and,
    b) at least one of:
       i) calculate an object score using the image region scores;
       ii) analyse the corresponding image regions to identify objects in the volume in accordance with the image region score of each corresponding image region; and,
       iii) perform a visual hull technique using the image region score of each corresponding image region as a weighting.

13. A system according to claim 1, wherein the one or more processing devices are configured to interpret the images in accordance with calibration data, wherein the calibration data includes at least one of:
    a) intrinsic calibration data indicative of imaging properties of each imaging device; and,
    b) extrinsic calibration data indicative of relative positioning of the imaging devices within the environment, and wherein the one or more processing devices are configured to generate calibration data during a calibration process by at least one of:
       i) receiving images of defined patterns captured from different positions using an imaging device and analysing the images to generate calibration data indicative of a image capture properties of the imaging device; and,
       ii) receiving captured images of targets within the environment, analysing the captured images to identify images captured by different imaging devices which show the same target and analysing the identified images to generate calibration data indicative of a relative position and orientation of the imaging devices.

14. A system according to claim 1, wherein an object is associated with machine readable coded data indicative of an object identity and where at least one of:
    a) the machine readable coded data is visible data, and wherein the one or more processing devices are configured to analyse the images to detect the machine readable coded data; and,
    b) the machine readable coded data is encoded on a tag associated with the object, and wherein the one or more processing devices are configured to receive signals indicative of the machine readable coded data from a tag reader.

15. A system according to claim 1, wherein the one or more processing devices are configured to:
    a) use object movements to determine predicted object movements;
    b) compare the predicted object movements to the situation awareness rules, wherein the situation awareness rules are indicative of at least one of:
       i) permitted object travel paths;
       ii) permitted object movements;
       iii) permitted proximity limits for different objects;
       iv) permitted zones for objects; and,
       v) denied zones for objects; and,
    c) identify situational awareness events if at least one of:
       i) an object movement deviates from a permitted object travel path defined for the object;
       ii) an object movement deviates from a permitted object movement for the object;
       iii) two objects are within permitted proximity limits for the objects;
       iv) two objects are approaching permitted proximity limits for the objects;
       v) two objects are predicted to be within permitted proximity limits for the objects;
       vi) two objects have intersecting predicted travel paths;
       vii) an object is outside a permitted zone for the object;
       viii) an object is exiting a permitted zone for the object;
       ix) an object is inside a denied zone for the object; and,
       x) an object is entering a denied zone for the object.

16. A system according to claim 1, wherein the one or more processing devices are configured to:
    a) generate an environment model, the environment model being indicative of at least one of:
       i) the environment;
       ii) a location of imaging devices in the environment;
       iii) current object locations;
       iv) object movements;
       v) predicted object locations; and,
       vi) predicted object movements; and,
    b) generate a graphical representation of the environment model.

17. A system according to claim 1, wherein in response to identification of a situational awareness event, the one or more processing devices are configured to at least one of:
    a) record an indication of the situational awareness event;
    b) generate a notification indicative of the situational awareness event;

c) cause an output device to generate an output indicative of the situational awareness event;
d) activate an alarm; and,
e) cause operation of an object to be controlled.

18. A system according to claim 1, wherein the imaging devices are at least one of:
   a) security imaging devices;
   b) monoscopic imaging devices;
   c) non-computer vision based imaging devices; and,
   d) imaging devices that do not have associated intrinsic calibration information.

19. A method for situational awareness monitoring within an environment, wherein the method includes, in one or more processing devices:
   a) receiving an image stream including a plurality of captured images from each of a plurality of imaging devices, the plurality of imaging devices being configured to capture images of objects within the environment and at least some of the imaging devices being positioned within the environment at different known locations and having at least partially overlapping fields of view;
   b) identifying overlapping images in the different image streams, the overlapping images being images captured by imaging devices having overlapping fields of view;
   c) analysing the overlapping images using different known locations of the plurality of imaging devices to determine object locations within the environment;
   d) determining an object identity for at least one object, wherein:
      i. the object identity is at least one of:
         1. indicative of an object type; and,
         2. uniquely indicative of the object and,
      ii. the object identity is determined by at least one of:
         1. analysing movement patterns;
         2. using image recognition; and,
         3. using machine readable coded data;
   e) analysing changes in the object locations over time to determine object movements within the environment;
   f) comparing the object movements to situational awareness rules at least in part using the object identity by:
      i. selecting one or more situational awareness rules in accordance with the object identity; and,
      ii. comparing the object movement to the selected situational awareness rules; and,
   g) using results of the comparison to identify situational awareness events.

20. A system for situational awareness monitoring within an environment, wherein the system includes one or more processing devices configured to:
   a) receive an image stream including a plurality of captured images from each of a plurality of imaging devices, the plurality of imaging devices being configured to capture images of objects within the environment and at least some of the imaging devices being statically positioned within the environment having at least partially overlapping fields of view;
   b) identify overlapping images in the different image streams, the overlapping images being images captured by imaging devices having overlapping fields of view;
   c) analyse the overlapping images to determine object locations within the environment;
   d) determine an object identity for at least one object, wherein:
      i) the object identity is at least one of:
         (1) indicative of an object type; and,
         (2) uniquely indicative of the object and,
      ii) the object identity is determined by at least one of:
         (1) analysing movement patterns;
         (2) using image recognition; and,
         (3) using machine readable coded data;
   e) analyse changes in the object locations over time to determine object movements within the environment;
   f) compare the object movements to situational awareness rules at least in part using the object identity by:
      i) selecting one or more situational awareness rules in accordance with the object identity; and,
      ii) comparing the object movement to the selected situational awareness rules; and,
   g) use results of the comparison to identify situational awareness events.

21. A system for situational awareness monitoring within an environment, wherein the system includes one or more processing devices configured to:
   a) receive an image stream including a plurality of captured images from each of a plurality of imaging devices, the plurality of imaging devices being configured to capture images of objects within the environment and at least some of the imaging devices being positioned within the environment and having at least partially overlapping fields of view;
   b) identify overlapping images in the different image streams, the overlapping images being images captured by imaging devices having overlapping fields of view;
   c) analyse the overlapping images and triangulation of the plurality of imaging devices to determine object locations within the environment;
   d) determine an object identity for at least one object, wherein:
      i) the object identity is at least one of:
         (1) indicative of an object type; and,
         (2) uniquely indicative of the object and,
      ii) the object identity is determined by at least one of:
         (1) analysing movement patterns;
         (2) using image recognition; and,
         (3) using machine readable coded data;
   e) analyse changes in the object locations over time to determine object movements within the environment;
   f) compare the object movements to situational awareness rules at least in part using the object identity by:
      i) selecting one or more situational awareness rules in accordance with the object identity; and,
      ii) comparing the object movement to the selected situational awareness rules; and,
   g) use results of the comparison to identify situational awareness events.

* * * * *